US008526618B2

(12) United States Patent
Little et al.

(10) Patent No.: US 8,526,618 B2
(45) Date of Patent: *Sep. 3, 2013

(54) MULTIPLE-STAGE SYSTEM AND METHOD FOR PROCESSING ENCODED MESSAGES

(75) Inventors: Herbert Anthony Little, Waterloo (CA); Michael Stephen Brown, Kitchener (CA); Michael Kenneth Brown, Fergus (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/462,266

(22) Filed: May 2, 2012

(65) Prior Publication Data
US 2012/0216032 A1 Aug. 23, 2012

Related U.S. Application Data

(63) Continuation of application No. 10/493,507, filed as application No. PCT/CA02/01609 on Oct. 24, 2002, now Pat. No. 8,194,857.

(60) Provisional application No. 60/330,608, filed on Oct. 25, 2001.

(51) Int. Cl.
*H04L 29/06* (2006.01)
(52) U.S. Cl.
USPC .......................................................... 380/270
(58) Field of Classification Search
USPC ...................................................... 380/270
See application file for complete search history.

(56) References Cited

U.S. PATENT DOCUMENTS

| 6,266,775 | B1 | 7/2001 | Kamba | |
| 6,348,972 | B1 * | 2/2002 | Taniguchi et al. | 358/1.15 |
| 6,531,985 | B1 * | 3/2003 | Jones et al. | 343/702 |
| 7,003,667 | B1 * | 2/2006 | Slick et al. | 713/182 |
| 2001/0016043 | A1 * | 8/2001 | Banno | 380/271 |

(Continued)

FOREIGN PATENT DOCUMENTS

| EP | 1091285 | 4/2001 |
| GB | 2328125 | 2/1999 |

(Continued)

OTHER PUBLICATIONS

Dusse et al., "S/MIME Version 2 Message Specification", RFC 2311, Mar. 1998, pp. 1-37.*

(Continued)

*Primary Examiner* — Jeffrey D Popham
(74) *Attorney, Agent, or Firm* — Alexander Anishchenko; Borden Ladner Gervais LLP

(57) ABSTRACT

System and methods for processing encoded messages at a message receiver are described. Encoded message processing is performed in multiple stages. In a first stage, a new received message is at least partially decoded by performing any decoding operations that require no user input and a resulting context object is stored in memory, before a user is notified that the new message has been received. When the user accesses the new message, any further required decoding operations are performed on the stored context object in a second stage of processing. The message can subsequently be displayed or otherwise processed relatively quickly, without repeating the first stage decoding operations. Decoding operations may include signature verification, decryption, other types of decoding, or some combination thereof.

25 Claims, 12 Drawing Sheets

(56) References Cited

U.S. PATENT DOCUMENTS

| | | | |
|---|---|---|---|
| 2001/0050990 A1* | 12/2001 | Sudia | 380/286 |
| 2002/0007453 A1* | 1/2002 | Nemovicher | 713/155 |
| 2002/0051544 A1 | 5/2002 | Kikuchi et al. | |

FOREIGN PATENT DOCUMENTS

| | | |
|---|---|---|
| JP | 06-276221 | 9/1994 |
| JP | 07-162407 | 6/1995 |
| JP | 10-107832 | 4/1998 |
| JP | 11-008617 | 1/1999 |
| JP | 11-088410 | 3/1999 |
| JP | 11-252161 | 9/1999 |
| JP | 2000-115229 | 4/2000 |
| JP | 2000-124892 | 4/2000 |
| JP | 2001-175552 | 6/2001 |
| JP | 2002-33760 | 1/2002 |
| WO | 99/63709 | 12/1999 |
| WO | 00/31931 | 6/2000 |
| WO | 01/63383 | 8/2001 |
| WO | 01/63386 | 8/2001 |
| WO | WO 01/63383 * | 8/2001 |
| WO | 01/71608 | 9/2001 |

OTHER PUBLICATIONS

English Language Abstract of JP 2010-063580, published Jun. 3, 1998.
English Language Abstract of JP-2011-066001, published Sep. 3, 1999.
Office Action issued by the Canadian Patent Office on Aug. 19, 2008 for Canadian patent application No. 2,464,361.
Notice of Rejection by the Japanese Patent Office on May 28, 2010 for Japanese patent application No. 2006-293228.
Japanese Office Action dated Jun. 17, 2009, Japanese Application No. 2006-293228.
Dusse et al., S/MIME Version 2 Message Specification, Mar. 1998, pp. 1-37.
European Search Report of Application No. EP05022525.9-2416, dated Jan. 24, 2006, 4 pages.
Notice of Allowance of U.S. Appl. No. 10/493,507, dated Feb. 3, 2012, 8 pages.

* cited by examiner

MULTIPLE-STAGE SYSTEM AND METHOD FOR PROCESSING ENCODED MESSAGES

CROSS REFERENCE TO RELATED APPLICATIONS

This application is a continuation of U.S. patent application Ser. No. 10/493,507, filed Apr. 21, 2004, which is a National Phase Entry of International Patent Application No. PCT/CA2002/01609, filed on Oct. 24, 2002, which claims the benefit of priority of U.S. Provisional Patent Application No. 61/330,608, filed on Oct. 25, 2001, the contents of which are incorporated herein by reference in their entirety.

BACKGROUND OF THE INVENTION

1. Field of the Invention

The present invention relates generally to the field of communications, and in particular toward processing encoded messages such as e-mail messages.

2. Description of the State of the Art

In many known message exchange schemes, signatures, encryption, or both are commonly used to ensure the integrity and confidentiality of information being transferred from a sender to a recipient. In an e-mail system for example, the sender of an e-mail message could either sign the message, encrypt the message or both sign and encrypt the message. These actions may be performed using such standards as Secure Multipurpose Internet mail Extensions S/MIME), Pretty Good Privacy™ (PGP™), OpenPGP and many other secure e-mail standards.

When an encrypted message is received, it must be decrypted before being displayed or otherwise processed. Decryption is a processor-intensive operation which, on a mobile device with limited processing resources, tend to take a relatively long time, on the order of several seconds. Such time delays may be unacceptable for many mobile device users. Even if the message is not encrypted, it may be encoded in such a way that some processing may be required before displaying the message to the user. Two examples of such encoding would be the Base-64 encoding commonly used to transfer binary data embedded in email messages on the Internet, and the ASN.1 encoding required by many Internet and security standards. The decoding associated with these types of encoding may also cause a time delay that is unacceptable for many mobile device users.

Since the content of encrypted messages should generally remain secure even after receipt, such messages are normally saved to long term storage only in encrypted form and decryption operations must be performed each time an encrypted message is opened. Also, when a user asks to verify a signature on a message, the original message contents are typically required to perform the operation, so messages are often stored in their encoded form. Therefore, each time such an encoded message is opened or displayed for example, the decoding operations must be repeated as well.

There is therefore a general need for a faster and less processor-intensive message processing system and method.

SUMMARY

In accordance with the teachings disclosed herein, a method and system for processing messages at a message receiver preferably are provided. The method and system receive an encoded message, at least partially decode the received message, store the partially decoded message to memory, and indicate that the encoded message has been received. The stored partially decoded message is then further decoded if necessary and used for subsequent processing of the received message.

A method for processing encoded messages at a wireless mobile communication device according to an aspect of the invention comprises the steps of receiving at the wireless mobile communication device an encoded message, wherein a plurality of decoding operations are to be performed upon the encoded message before the decoded message is used within the wireless mobile communication device, performing a first decoding operation upon the encoded message so as to generate a partially decoded message, wherein the first decoding operation performs at least one of the decoding operations which are to be performed upon the encoded message, storing the partially decoded message to a memory df the wireless mobile communication device, receiving a request to access the received message, retrieving the partially decoded message from the memory, and performing a second decoding operation upon the partially decoded message so as to generate a decoded message for use within the wireless mobile communication device.

A system for processing encoded messages at a wireless mobile communication device according to another aspect of the invention comprises means for receiving at the wireless mobile communication device an encoded message, wherein a plurality of decoding operations are to be performed upon the encoded message before the decoded message is used within the wireless mobile communication device, means for performing a first decoding operation upon the encoded message so as to generate a partially decoded message, wherein the first decoding operation performs at least one of the decoding operations which are to be performed upon the encoded message, means for storing the partially decoded message to a memory of the wireless mobile communication device, means for retrieving the partially decoded message from the memory, and means for performing a second decoding operation upon the partially decoded message so as to generate a decoded message for use within the wireless mobile communication device.

In another embodiment of the invention, computer software stored on a computer readable medium comprises program code for carrying out a method that processes an encoded message at a wireless mobile communication device, the method comprising the steps of performing a first decoding operation upon the encoded message so as to generate a partially decoded message, wherein the first decoding operation performs at least one of the decoding operations which are to be performed upon the encoded message, storing the partially decoded message to a memory of the wireless mobile communication device, retrieving the partially decoded message from the memory in response to a request to access the received message, and performing a second decoding operation upon the partially decoded message so as to generate a decoded message for use within the wireless mobile communication device.

According to a further embodiment of the invention, a system that processes an encoded message at a wireless mobile communication device, wherein a plurality of decoding operations are to be performed upon the encoded message before the message is used within the wireless mobile communication device, comprises a first decoding stage having a data access connection to the encoded message, said first decoding stage performing a first decoding operation upon the encoded message so as to generate a partially decoded message, wherein the first decoding stage performs at least one of the plurality of decoding operations, a memory that stores the partially decoded message, and a second decoding stage having a data access connection to the partially decoded message stored in the memory, wherein the second decoding stage performs a second decoding operation upon the partially decoded message so as to generate a decoded message for use within the wireless mobile communication device.

As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

DETAILED DESCRIPTION OF THE DRAWINGS

Encoding includes such operations as signing, encryption, encoding such as Base-64 or ASN.1 encoding, more general encoding by otherwise reversibly transforming data, or any combination thereof. Similarly, "decoding" therefore includes any processing operations necessary to invert or reverse any encoding applied to a message.

Figure 1:
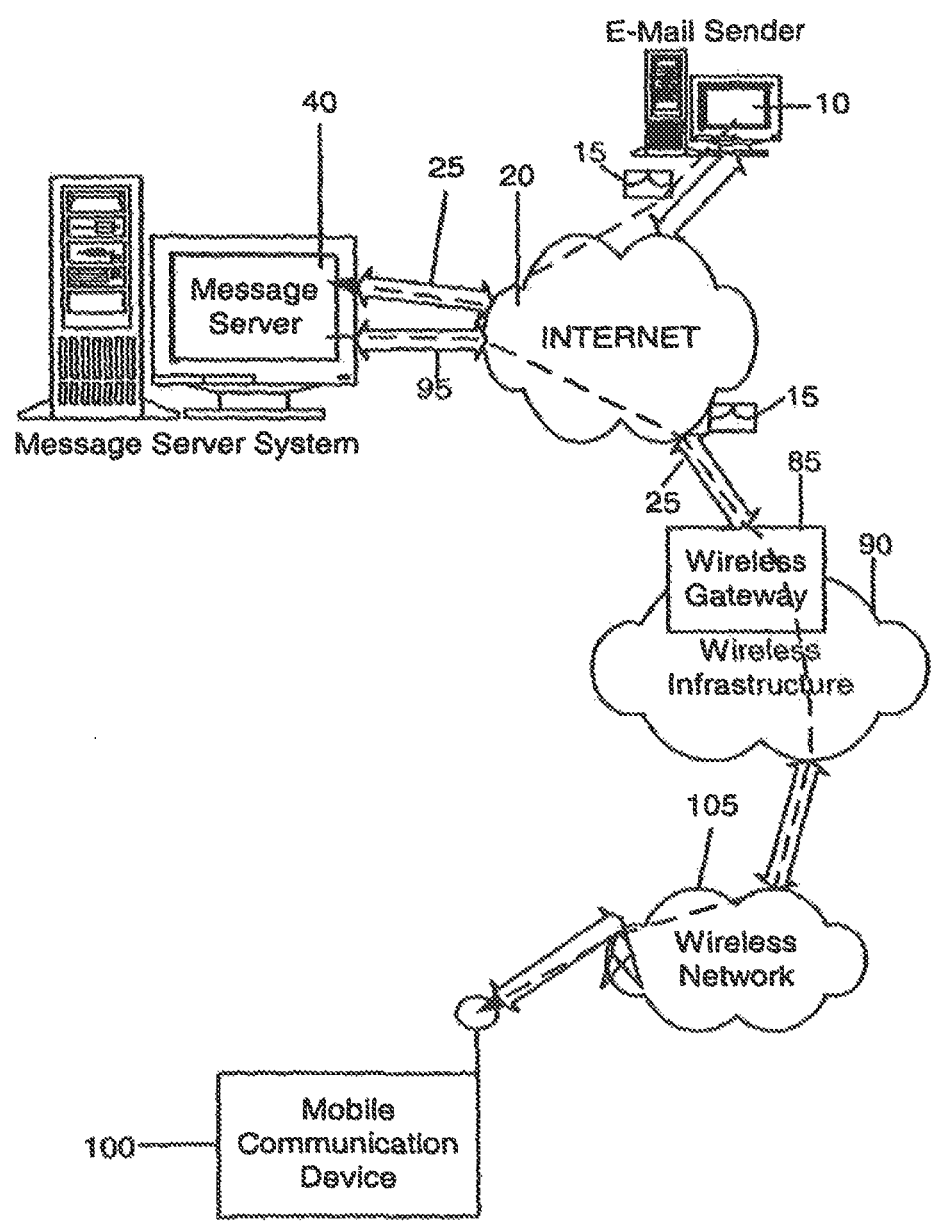
FIG. 1 is an overview of an example communication system in which a wireless communication device may be used.

FIG. 1 is an overview of an example communication system in which a wireless communication device may be used. One skilled in the art will appreciate that there may be hundreds of different topologies, but the simple system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
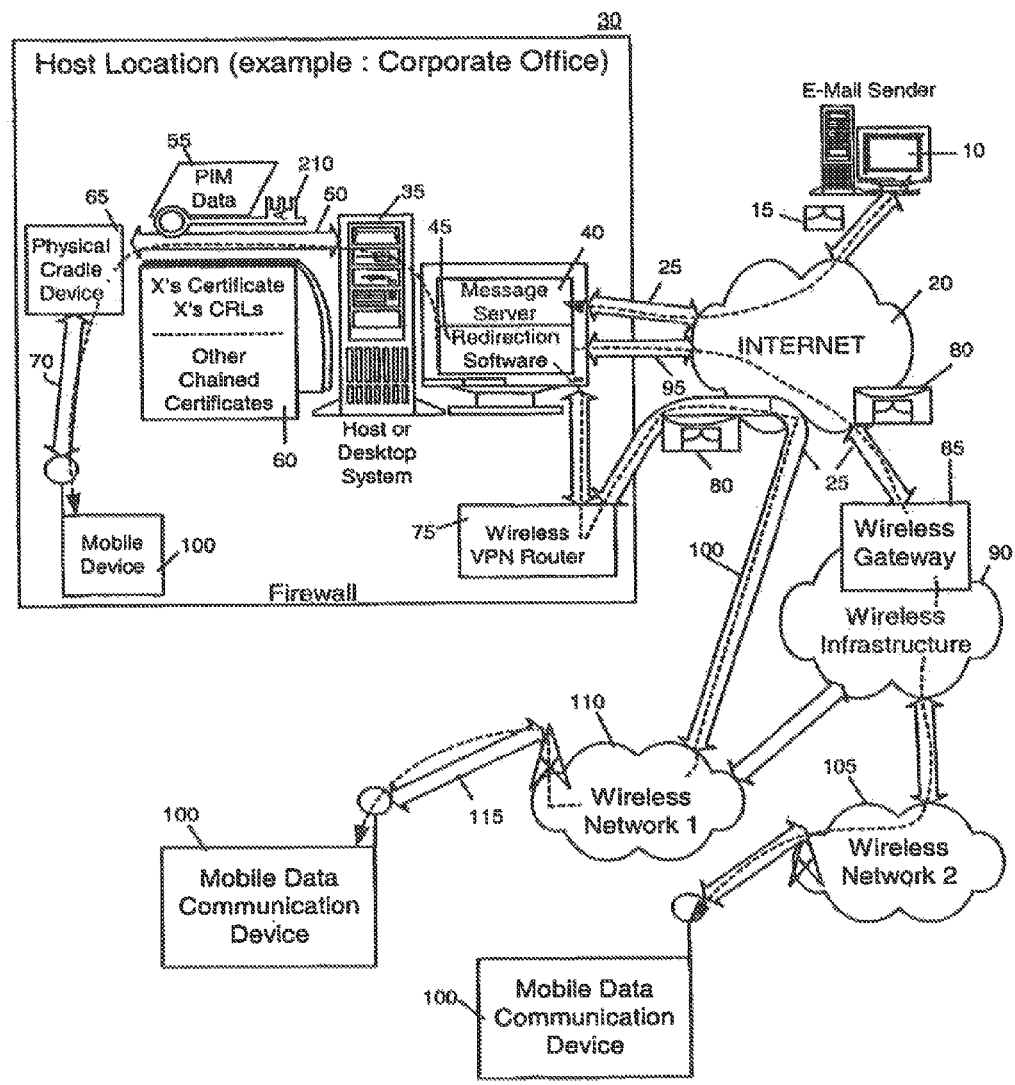
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 Patent"), entitled "System and Method for Pushing Information From A Host System To A Mobile Data Communication Device Having A Shared Electronic Address", and issued to the assignee of the instant application on Apr. 17, 2001, and U.S. patent application Ser. Nos. 09/401,868, 09/545,963, 09/528,495, 09/545,962, and 09/649,755, all of which are hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages, directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

Turning back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (NM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 210 such as an S/MIME or POP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Although the encoded message processing systems and methods described herein are in no way dependent upon pre-loading of information from a host computer or a computer 35 in a host system 30 through a port arrangement, such pre-loading of typically bulky information such as Certs and CRLs may facilitate transmission of encoded messages, particularly those that have been encrypted and/or signed or require additional information for processing, to mobile devices 100. If an alternate mechanism, like S/MIME or PGP e-mail messages, for example, is available for transferring such messages to a mobile device, then these messages may be processed as described herein.

Having described several typical communication network arrangements, the transfer and processing of secure e-mail messages will now be described in further detail.

E-mail messages generated using the S/MIME and PGP techniques may include encrypted information, a digital signature on the message contents, or both. In signed S/MIME operations, the sender takes a digest of a message and signs the digest using the sender's private key. A digest is essentially a checksum, CRC or other preferably non-reversible operation such as a hash on the message, which is then signed. The signed digest is appended to the outgoing message, possibly along with the Cert of the sender and possibly any required Certs and CRLs. The receiver of this signed message must also take a digest of the message, compare this digest With the digest appended to the message, retrieve the sender's public key, and verify the signature on the appended digest. If the message content has been changed, then the digests will be different or the signature on the digest will not verify properly. If the message is not encrypted, this signature does not prevent anyone from seeing the contents of the message, but does ensure that the message has not been tampered with and is from the actual person as indicated on the 'From' field of the message.

The receiver may also verify the Cert and CRLs if they were appended to the message. A certificate chain is a Cert along with a number of other Certs required to verify that the original Cert is authentic. While verifying the signature on a signed message, the receiver of the message will also typically obtain a Cert chain for the signing Cert and verify that each Cert in the chain was signed by the next Cert in the chain, until a Cert is found that was signed by a root Cert from a trusted source, perhaps from a large Public Key Server (PKS) associated with a Certificate Authority (CA) such as Verisign or Entrust for example, both prominent companies in the area of public key cryptography. Once such a root Cert is found, a signature can be verified and trusted, since both the sender and receiver trust the source of the root Cert.

In encrypted S/MIME message operations, a one-time session key is generated and used to encrypt the body of the message, typically with a symmetric cipher like Triple DES. The session key is then encrypted using the receiver's public key, typically with a public key encryption algorithm like RSA. If the message is addressed to more than one receiver, the same session key is encrypted using the public key of each receiver. The encrypted message body, as well as all encrypted session keys, is sent to every receiver. Each receiver must then locate its own session key, possibly based on a generated Recipient Info summary of the receivers that may be attached to the message, and decrypt the session key using its private key. Once the session key is decrypted it is then used to decrypt the message body. The S/MIME Recipient Info attachment can also specify the particular encryption scheme that must be used to decrypt the message. This information is normally placed in the header of the S/MIME message.

Those skilled in the art will appreciate that these operations relate to an illustrative example of S/MIME messaging and its associated encoding operations, namely encryption and/or signing. However, the instant invention is in no way restricted thereto. Encryption and signing are merely two examples of the type of encoding operations to which the systems and methods described herein may be applied.

Figure 3:
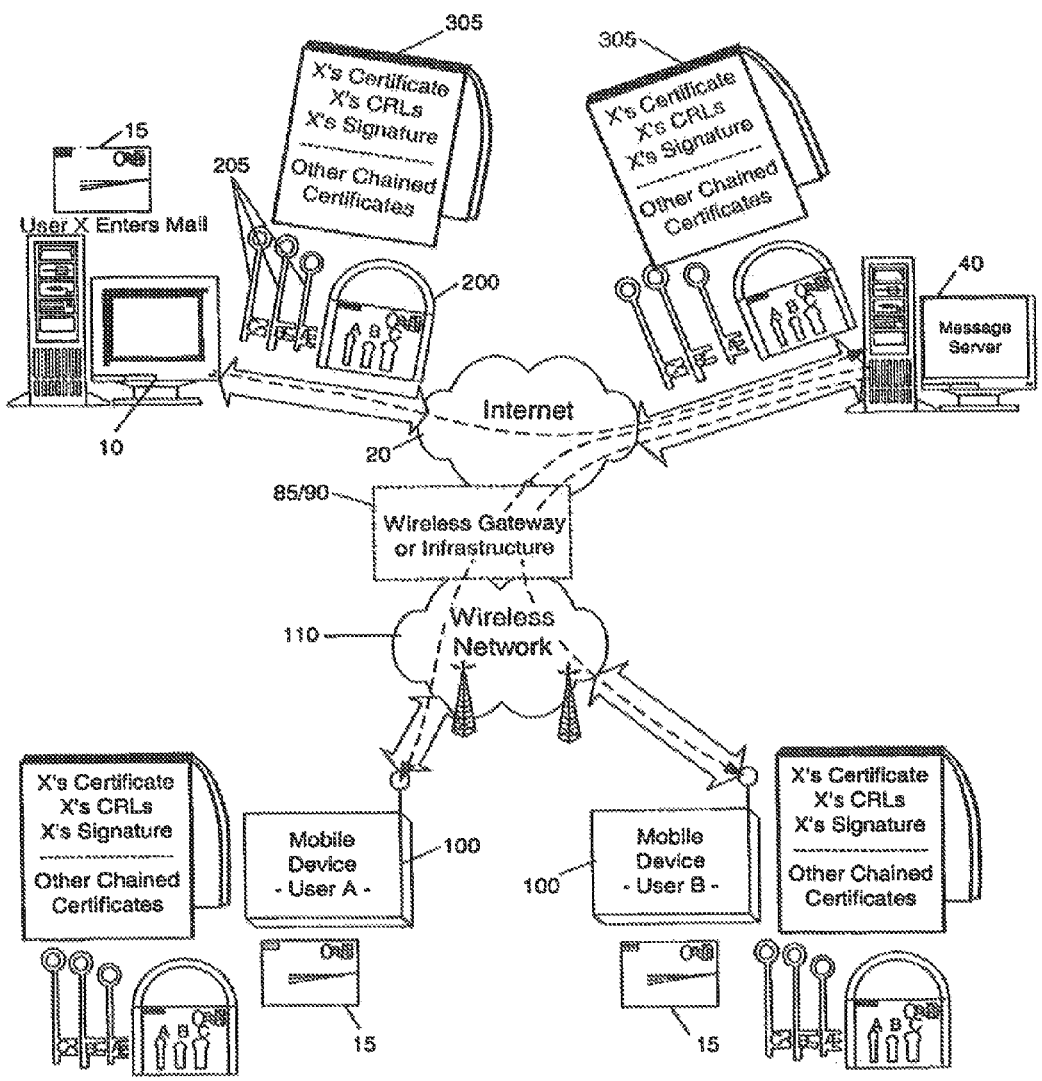
FIG. 3 illustrates an example system for transferring messages that were encoded by encryption and possibly signing using S/MIME or similar techniques.

Referring now to FIG. 3, encoded message transfer will be described in further detail. FIG. 3 illustrates an example system for transferring messages that were encoded by encryption and possibly signing using S/MIME or similar techniques.

In FIG. 3, User X at system 10 creates a mail message 15 and decides to encrypt and sign the message. To achieve this, the system 10 first creates a session key and encrypts the message. Then the public key for each recipient is retrieved from either local storage or a Public Key Server (PKS) (not shown) on the Internet 20, for example, if public key cryptography is used. Other crypto schemes may instead be used, although public key cryptography tends to be common, particularly when a system includes a large number of possible correspondents. In a system such as shown in FIG. 3, there may be millions of e-mail systems such as 10 that may from time to time wish to exchange messages with any other e-mail systems. Public key cryptography provides for efficient key distribution among such large numbers of correspondents. For each recipient, the session key is encrypted, as shown at A, B and C for three intended recipients, and attached to the message preferably along with the RecipientInfo section. Once the encryption is complete, a digest of the new message, including the encrypted session keys, is taken and this digest is signed using the sender's private key. In the case where the message is signed first, a digest of the message would be taken without the encrypted session keys. This digest, along with all the signed components, would be encrypted using a session key and each session key would be further encrypted using each recipient's public key if public key crypto is used, or another key associated with each recipient if the sender is able to securely exchange e-mail with one or more recipients through some alternate crypto arrangement.

This encrypted and signed message 200, with the session keys 205 and Cert information 305, is sent to the message server 40 running on a computer system. As described above, the message server 40 may process the message and place it into the appropriate user's mailbox. Depending upon the mobile device e-mail access scheme, a mobile device 100 may request the e-mail from the message server 40, or redirection software 45 (see FIG. 2) may detect the new message and begin the redirection process to forward the new e-mail message to each recipient that has a mobile device 100. Alternatively, the e-mail message and attachments may possibly be sent directly to a mobile device 100 instead of or in addition to a message server system. Any of the transfer mechanisms described above, including over the Internet 20 through a wireless gateway and infrastructure 85/90 and one or more wireless networks 110 or through the Internet 20 and wireless network 110 using a wireless VPN router 75 (in FIG. 2, not shown in FIG. 3) may be used to forward the e-mail message and attachments to a device 100. Other transfer mechanisms that are currently known or may become available in the future, may also be used to send the message and attachments to a mobile device 100.

FIG. 3 illustrates receipt of the entire message on each mobile device 100. Before the message is sent to a mobile device 100, the signature or encryption sections of the message may instead be re-organized and only the necessary portions sent to each mobile device 100, as described in detail in U.S. patent application Ser. No. 60/297,681, filed on Jun. 12, 2001, and Ser. No. 60/365,535, filed on Mar. 20, 2002, both assigned to the assignee of the present application and incorporated in their entirety herein by reference. These earlier applications disclose several schemes for rearranging secure messages and limiting the amount of information sent to a mobile device. For example, in accordance with one scheme described in the above applications, the message server system determines the appropriate session key for each mobile device and sends only that encrypted session key with the message to the mobile device. The above applications also disclose techniques for limiting signature-related information that must be sent to a mobile device with an encrypted and signed message, such as when the message server system verifies the digital signature and sends to the mobile device the result of the digital signature verification. Therefore, although FIG. 3 shows entire messages, with all encrypted session keys and signature-related attachments, at each mobile device 100, the present encrypted message processing techniques do not require that entire messages be forwarded to the mobile device 100. Encrypted session keys for other recipients and signature information, for example, may or may not necessarily be received at each mobile device 100.

If the message is not signed, such that X's signature and other signature-related information including X's CRLs, X's Cert and other chained Certs would not be part of the message, or the message was signed before it was encrypted, then when a user of a mobile device 100 opens the message, the appropriate encrypted session key is found and decrypted. However, if the message was signed after being encrypted then the signature is preferably first verified and the correct session key is then found and decrypted. As those skilled in the art will appreciate, session key decryption commonly involves the further security operation of entering a password or passphrase preferably known only to the user of a mobile device 100.

As described earlier, before an encoded message can be displayed to the user, it must first be decoded (possibly including decrypting the message), and any decoding steps may require a long time to complete. In accordance with a novel processing technique, any decoding steps that can be performed without any action or input from a user are performed before the user is informed of the receipt of the message. The resultant partially or possibly fully decoded message can then be stored as a context object in a memory. Upon completion of these decoding steps, the user is informed that the message has been received. The stored context object may then be retrieved and further decoded if necessary when the decoded message is required for display or further processing.

For example, consider a message that is encoded by being signed but not encrypted. The contents of the message are not secret in this case, but they have nonetheless been encoded in some way. Since signature verification often does not require entry of a secret password or passcode by a user, the message may be decoded, and the signature on the message may be verified, before the user is even aware that the message has arrived. The resultant context object, in this example the complete decoded message, is then preferably stored in a storage area such as in a random access memory (RAM) on a mobile device 100. When the signature verification is complete, the user is notified that a new message has arrived by displaying an icon on a mobile device display screen or producing some other new message indication, for example. When the user wishes to display the received message, the stored decoded message is simply retrieved from memory, without requiring any further decoding. Note that it may be important to retain the original encoded message so that signature verification may be performed again using the original encoding if necessary.

As another example, consider an encoded message that is encrypted and then signed. In this case, the signature can be decoded and possibly verified automatically without any action or input by the user. However, decryption normally requires a user to enter a password or passcode. Therefore, in this example, the signature is decoded and possibly verified when the message is received, the resultant context object is stored in a memory, and the user is notified that the new message has been received. When the user wishes to display the new message, then the context object is retrieved from the memory. Since the signature decoding and verification has already been completed for the context object, only the decryption operation must be performed before the new message is displayed. The perceptible time delay associated with displaying or processing a new encoded message may thereby be significantly reduced. Although both the signature verification and decryption operations are performed, the signature verification is preferably performed in the background, before the user is aware that the message has been received, and as such will not be perceived by the user as a decoding delay.

As a final example, consider an encoded message that is signed and then encrypted. In this case, the encrypted data cannot be decrypted without prompting the user for a password or passcode. However, much of the preliminary work involved with decoding and decrypting the message may be performed, including, for example, decoding operations associated with transmission encoding and retrieval of any required decryption keys. The context object resulting from as much as possible of this preliminary work is stored in a memory, and the user is notified that the new message has been received. When the user wishes to display the new message, then the context object is retrieved from the memory. Since the preliminary decryption work has already been performed, only the remaining part of the decryption work, and the signature decoding and verification must still be performed. The perceptible time delay associated with displaying or processing a new encoded message may thereby be significantly reduced. Although both the decryption and signature verification operations are performed, a large portion of the decryption is preferably performed in the background, before the user is aware that the message has been received, and as such will not be perceived by the user as a decoding delay.

Thus, according to this aspect of the instant invention, decoding of an encoded message is split into multiple stages. The first stage is performed in the background, before a user is informed that a message has been received. Any operations that may be performed without any input or other action by a user are preferably part of the first processing stage. After first stage processing has been completed, a context object resulting from the first stage of processing is stored to a memory and the user is informed of the receipt of a new message. When the user accesses the new message for display or further processing, the second stage of processing is invoked. The second stage includes any decoding operations required to complete the decoding of the new message. Instead of performing all decoding when a new message is accessed, as in known messaging schemes, the second stage processing according to this aspect of the invention retrieves the stored context object and performs any further required decoding operations. The user is thereby not aware of the first stage operations or the associated time delays.

It will be apparent to those skilled in the art that there is preferably no fixed delineation between the first and second processing stages. When a new encoded message is received, the receiver proceeds as far as possible with decoding operations before the user is notified that the message has been received. In the first example above, the signature is verified during the first stage and completes the decoding of the received message. Other first, stage operations may include, for example, processing of Base-64 encoding or MIME encoding, which do not normally require user input. In the second example, signature verification is performed during the first stage and the resultant context object is stored for use in the second stage, involving decryption of the message content. In the third example, as much of the preliminary processes involved in the decryption is performed during the first stage and the resultant context object is stored for use in the second stage, involving the remainder of the decryption and signature verification.

In some embodiments, it may be preferred that context objects are not stored in RAM for long periods of time, for example, if signatures are to be verified each time a new CRL is loaded onto a mobile device. Therefore, as a possible option, a context object for any message could be stored for only a short period of time, after which it would automatically be removed from RAM. The length of this short period of time could be configured, for example, by the user or by a system administrator, some such configurations are described below.

Figure 3A:
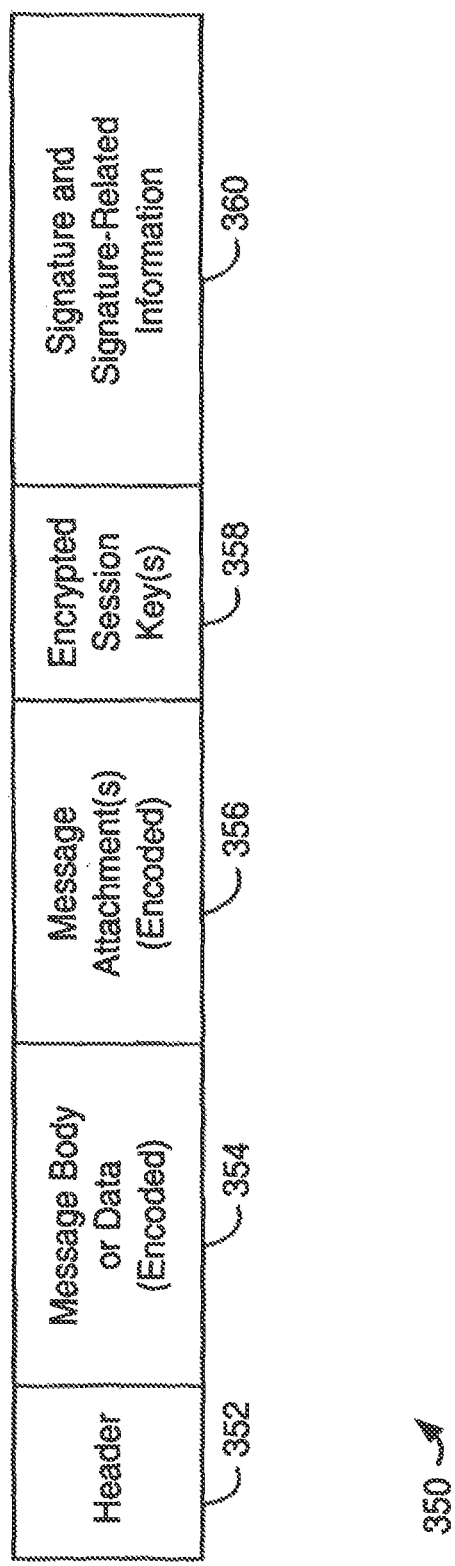
FIG. 3a shows a general encoded message format.

FIG. 3a shows a general encoded message format, and is useful in illustrating the concept of temporary message storage. The encoded message 350 includes a header portion 352, an encoded body portion 354, one or more encoded message attachments 356, one or more encrypted session keys 358, and signature and signature-related information 360 such as CRLs and Certs. Although the message format shown in FIG. 3 relates to a signed and encrypted message, encoded messages include encrypted messages, signed messages, encrypted and signed messages, or otherwise encoded messages.

Those skilled in the art will appreciate that the header portion 352 typically includes addressing information such as "To", "From" and "CC" addresses, as well as possibly message length indicators, sender encryption and signature scheme identifiers when necessary, and the like. Actual message content normally includes a message body or data portion 354 and possibly one or more file attachments 356, which may be encrypted by the sender using a session key. If a session key was used, it is typically encrypted for each intended recipient and included in the message as shown at 358. Depending upon the particular message transport mechanism used to send the message to a receiver such as a mobile device 100 (FIGS. 1-3), the message may include only the specific encrypted session key for that recipient or all session keys. If the message is signed, a signature and signature-related information 360 are included. Where the message is signed before encryption, according to a variant of S/MIME for example, the signature is also be encrypted.

As described in further detail below and in accordance with an aspect of the invention, if the encoded message is unencrypted, a receiver decodes the message body in a first stage of processing before a user is notified that the message has been received and stores the resulting context object, in this case the decoded message content, so that it may be subsequently viewed and/or processed without repeating the first stage decoding operations. As will be apparent from the foregoing, it is possible that all required decoding operations may be performed in the first stage, such that when the encoded message is to be accessed, the context object is retrieved from memory. If the message is encrypted, then any decoding operations not requiring user input are performed in a first processing stage, a resultant context object is stored in memory and the user is notified that the message has been received. In this illustrative example, it is assumed that a user must enter a password or passphrase before an encrypted message may be decrypted. When the message is accessed, the second processing stage begins and the user is prompted for a password or passphrase. The stored context object is retrieved and an appropriate key is used to decrypt encrypted content in the context object. If session keys are used, the receiver locates and decrypts a corresponding encrypted session key, uses the decrypted session key to decrypt any encrypted message and/or attachment content, and then if necessary further decodes the message body, for example, where the message body has been Base-64 encoded.

The format shown in FIG. 3a is for illustrative purposes only and it is to be understood that the present invention is applicable to encoded messages having other formats. For example, as described above, the processing systems and techniques described herein are applicable to signed or unsigned, encrypted or unencrypted, and otherwise encoded messages, such that a received message may not necessarily include the portions related to encryption and/or signing. In addition, the particular message components may appear in a different order than shown in FIG. 3a. Depending upon the message scheme used, a message may include fewer, additional, or different message sections or components.

The temporary storage area in which the context objects are stored is preferably in a volatile and non-persistent store. A context object may, for example, be stored for only a particular period of time, which may preferably be set by a user. A single context object storage time period may be set and applied to all messages, although more customized settings are also contemplated. Messages that normally arrive from certain senders or from senders whose e-mail addresses have the same domain name, for example, may have a specific relatively short context object message storage period, whereas context objects of encoded e-mails received from other senders, perhaps personal contacts, may be stored for a longer period of time. Alternatively, a user may be prompted for a storage time period each time a message is opened or closed.

The particular criteria controlling context object storage is preferably determined in accordance with the desired level of security of encoded messages at a mobile device. Storage of the context objects represents a trade-off between usability and security. Longer storage intervals improve usability at the cost of decreased security, since the context object of an encoded message may potentially be maintained after the sender's Cert has been revoked, for example, where signature verification was performed during first stage processing when the message was first received. If decryption is also performed during the first processing stage, then a longer context object storage interval represents a further security risk, since decrypted content is potentially available to an unauthorized device user for a longer time. A shorter message storage interval reduces the amount of time that context objects remain accessible. However, if its corresponding context object is removed from storage, both first and second stage processing operations must be repeated when an encoded message is accessed. Other memory management techniques, such as a least recently used (LRU) replacement scheme or over-writing of the oldest context object may also be used, such that context object storage is dependent upon memory resources instead of time interval settings.

Figure 4:
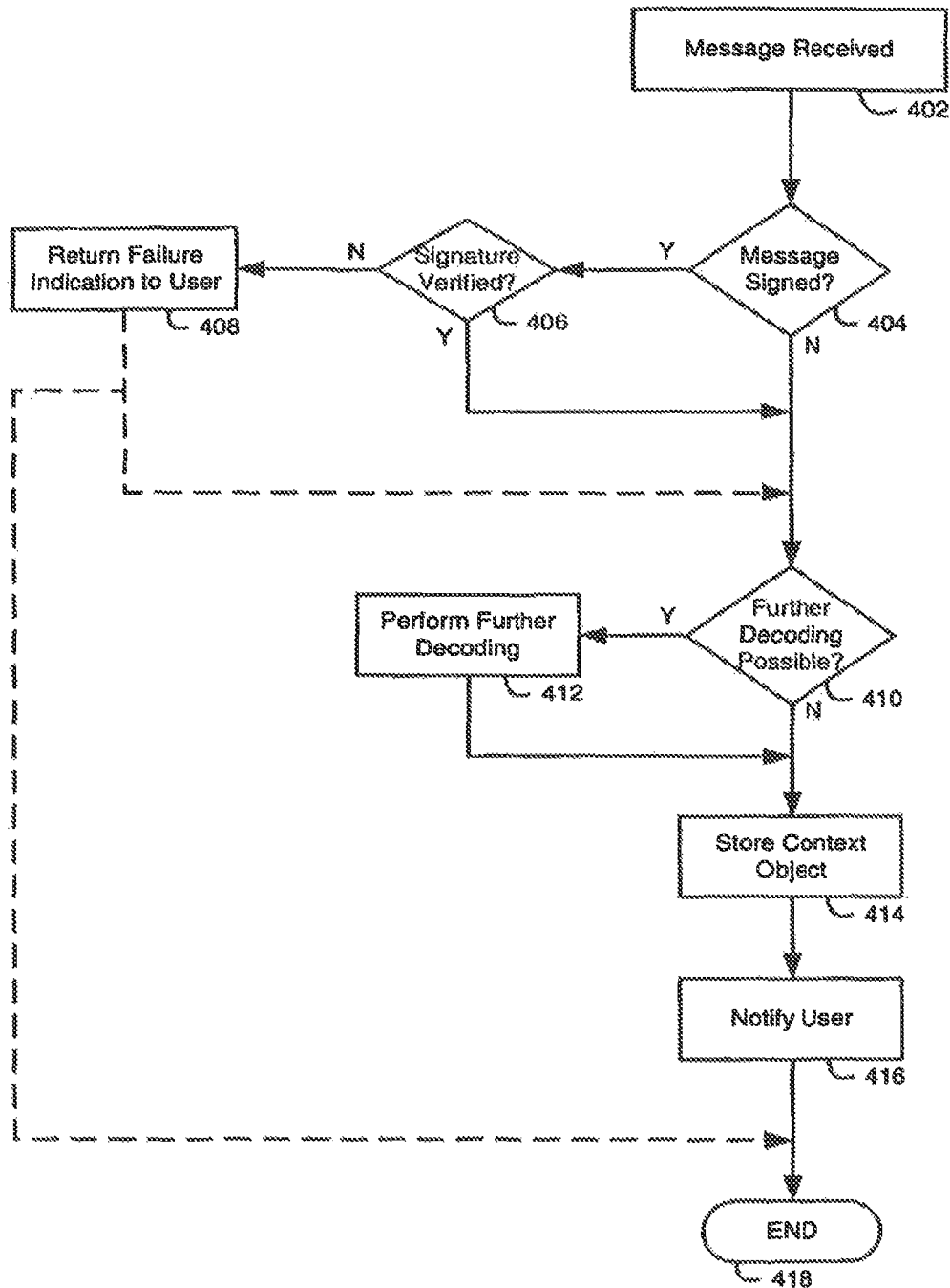
FIG. 4 is a flow diagram representing the first stage of a method for processing encoded messages.

FIG. 4 is a flow diagram representing the first stage of a method for processing encoded messages. Step 402 indicates receipt of a new message. If the received message was signed by the sender, as determined at step 404, then the mobile device attempts to verify the signature. Signature verification is one function that can typically done as part of the first processing stage, although those skilled in the art will appreciate that this may not always be the case. According to a variation of S/MIME, for example, a message may be signed before encryption, such that a message must first be decrypted before signature verification may be performed. However, in the example flow diagram of FIG. 4, signature verification is shown as a first stage process.

If the signature is properly verified at step 406 by determining a match between digests as described above, for example, processing continues at step 410. Otherwise, the user is given some indication that the signature verification failed, at step 408. Depending upon the particular signature scheme implemented or perhaps in response to a user selection to end processing, a message might not be further processed if the signature cannot be verified, and processing ends at step 418. However, in certain circumstances, the user may wish to proceed to view or otherwise process the message, even though the digests do not match and thus the message content may have been altered after the sender signed the message.

If the message was not signed (or signature verification cannot be performed without user input for decryption of the message, for example), the signature is verified, or processing should continue after a failed signature verification attempt, the mobile device determines in step 410 whether any further decoding is possible without any input or action from the user. If the message was encrypted and requires a password or passphrase for decryption, for example, then it is possible that no other processing of the received message may be performed in the first stage, or that only a portion of the decryption step may be performed in the first stage. The context object resulting from any first stage processing is then stored in memory at step 414, the user is notified that a new message has been received at step 416, and first stage processing ends at step 418. However, if further decoding is possible without user input, when the message has not been encrypted but its content is Base-64 encoded, for example, the further decoding operations are performed at step 412 and the resultant content object is stored to memory at step 414. First stage processing concludes when the user is notified of the receipt of the message at step 416 and processing ends at step 418.

Figure 5:
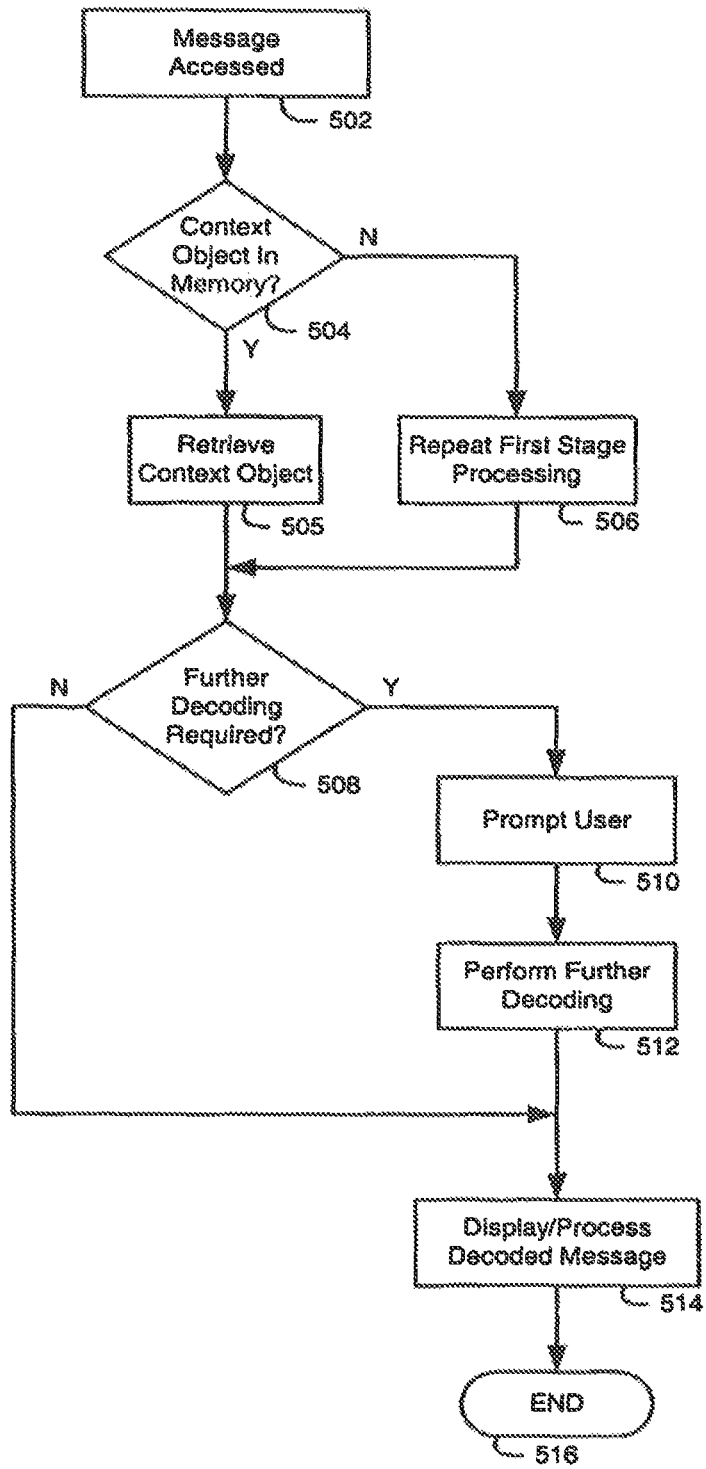
FIG. 5 is a flow diagram of a second stage of a message processing method for encoded messages.

Although FIG. 4 demonstrates a novel concept of temporarily storing a decoded message, an advantage of such decoded message storage will become apparent from the following description of FIG. 5. FIG. 5 is a flow diagram of a second stage of a message processing method for encoded messages.

In step 502, an encoded message is accessed by a user. According to an aspect of the invention, it is determined in step 504 whether a context object resulting from first stage processing is available in memory. If so, then the context object is retrieved from memory at step 505. Otherwise, when a context object has been overwritten or deleted from memory, for example, first stage processing is repeated, at step 506. In some circumstances, even when a context object is available in memory, a user or software on the mobile device may preferably insist on repetition of some or all first stage processing operations. This may be useful, for example, when signature verification is a first stage operation and a new CRL has been loaded on the mobile device since the first stage processing was performed for the message. Alternatively, the occurrence of an event or user action could invoke first stage processing operations for any or all messages for which a context object currently exists, thereby avoiding such forced first stage operations when a message is accessed.

After the context object has been retrieved or the first stage operations have been repeated, it is determined at step 508 whether further decoding is required. If all necessary decoding steps were performed as part of the first stage, then the processed message, or the corresponding context object if retrieved from memory, is displayed or processed at step 514 and the second processing stage ends at step 516. This situation may occur, for example, when a received message is not decrypted and all decoding operations could be performed without input or any other action from the user. If it is determined that further decoding is necessary, however, then the user may be prompted for any required information such as a password or passphrase (510) and the further decoding operations are performed (512). The resulting decoded message is then displayed or processed at step 514 and second stage processing ends at 516.

When a context object is available in memory, first stage processing and associated processing time may be avoided. First stage processing operations are performed in the background before the user is notified that a message has been received, such that this processing and inherent processing times are not perceptible by the user.

Although the first stage processing is shown in FIG. 5 as a separate step 506 which is performed before the further decoding determination is made in step 508, the first stage operations need not necessarily be performed separately when they are repeated. As described above, there is preferably no fixed delineation between the first and second processing stages. The first stage preferably ends when all decoding operations that can be performed without user input have been completed. The second stage then performs any remaining decoding operations and effectively "begins" wherever the first stage ended. Therefore, the separate step 506 is shown separately in FIG. 5 primarily for illustrative purposes. When no context object exists or first stage operations are to be repeated, then the second processing stage will typically encompass all processing operations, including any first stage operations.

It is also possible that the delineation between first and second stage operations is variable only up to a certain point. For example, certain specific operations may be designated as second stage operations, such that the specific operations and any subsequent operations dependent upon the result of any of the specific operations will always be performed in the second processing stage. In such embodiments, first stage processing may still proceed as far as possible, but only up to a point at which designated second stage operations must be performed. When user input is not necessarily the limiting factor in determining when the first processing stage ends, as in this example, the step 510 in FIG. 5 might not be required for second stage processing to begin.

Those skilled in the art will also appreciate that an encoded message processing method need not necessarily include all of the steps shown in FIGS. 4 and 5 or may include further steps and operations in addition thereto, depending upon the types of encoding applied by a message sender, for example. Other variations of the methods described above will be apparent to those skilled in the art and as such are considered to be within the scope of the invention.

Having described in detail several preferred embodiments of the present invention, including the preferred methods of operation, it is to be understood that this operation could be carried out with different elements and steps. The above preferred embodiments are presented only by way of example and are not meant to limit the scope of the invention described herein.

For example, although described primarily in the context of a mobile communication device, the encoded message processing systems and methods described above may reduce processor load and time delays associated with viewing or otherwise accessing encoded messages for which first stage decoding operations have been performed. Message decoding operations tend to involve much smaller time delays on desktop computer systems which typically have faster and much more powerful processors than smaller hand-held and portable devices. The power consumption associated with such processor intensive decoding operations also tends to be less of a concern in desktop or other larger computer systems with virtually unlimited power sources. However, the systems and methods described above may nonetheless be implemented in such systems.

Figure 6:
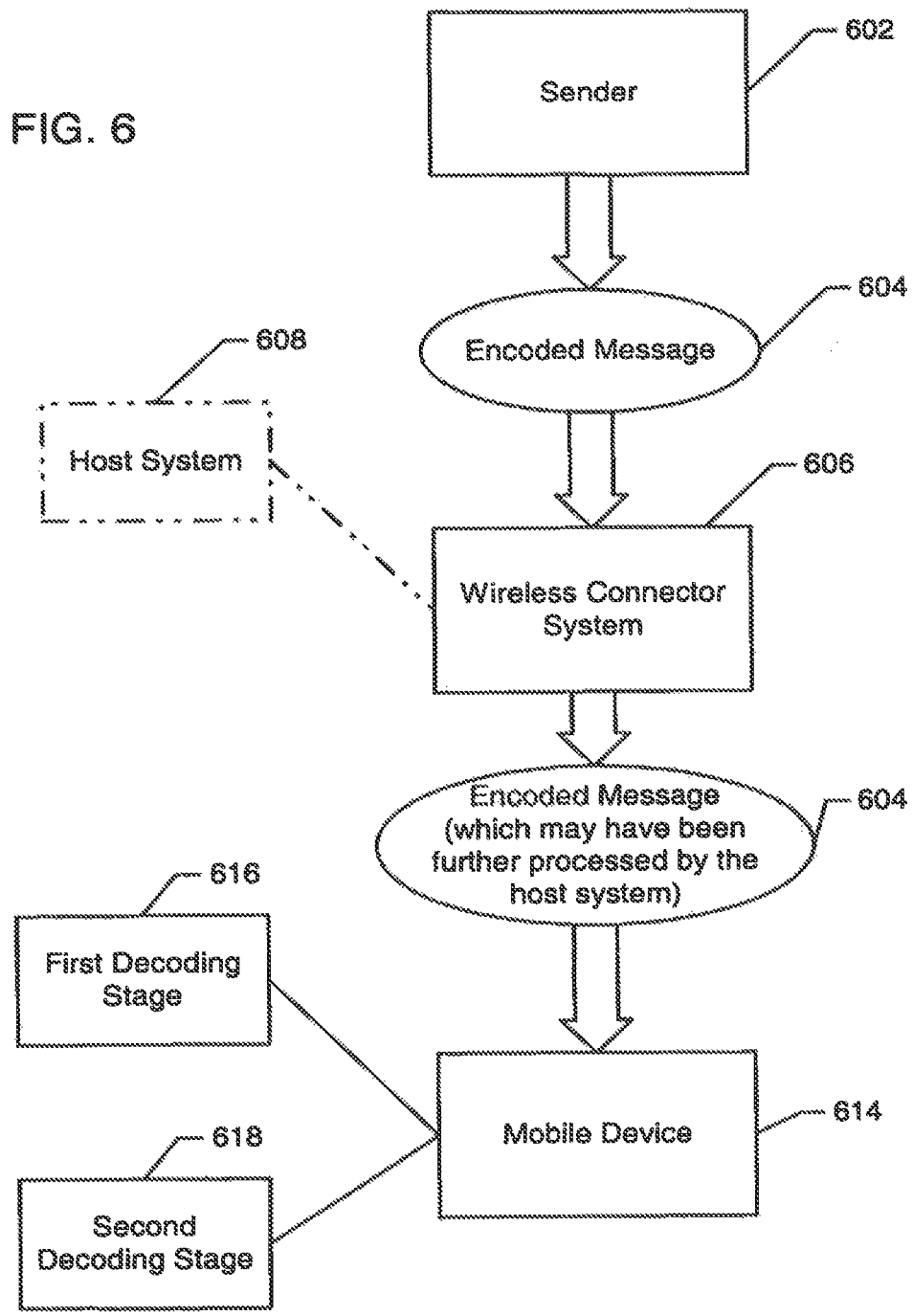
FIGS. 6 and 7 are block diagrams depicting processing of messages involving a mobile device.
Figure 7:
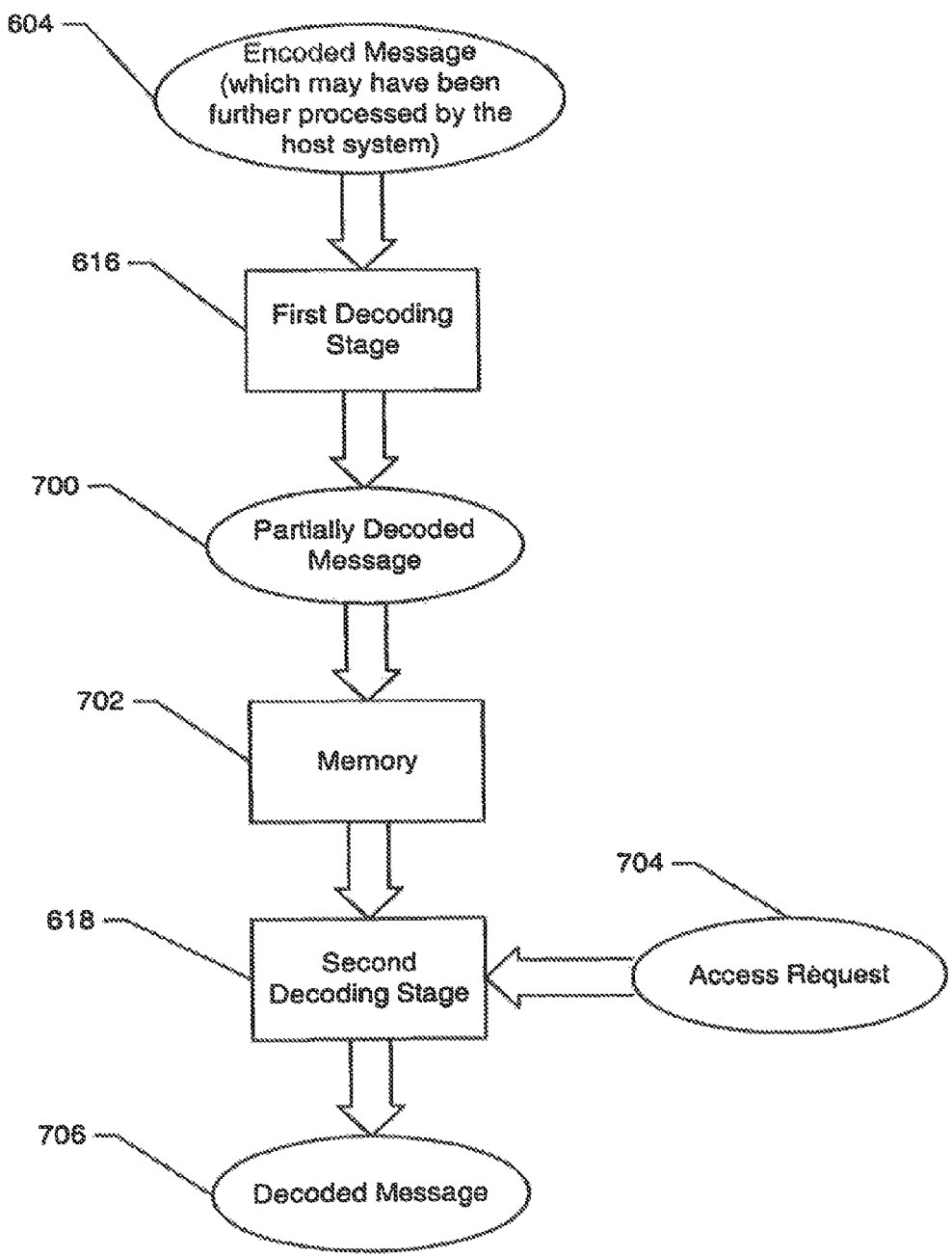

As further examples of the wide scope of the systems and methods described herein, FIGS. 6 and 7 illustrate additional situations where encoded messages are handled by a mobile device. FIG. 6 depicts an example wherein a wireless connector system 606 transmits a message 604 from a sender 602 that is addressed to one or more message receivers. In this example, the sender's message 604 is an encoded message.

The wireless connector system 606 may use a host system 608 in its transmission of the message 604 to a mobile device 614. The wireless connector system 606 may perform authentication and/or encryption message processing upon the sender's message 604, or the wireless connector system may be of the type that does not perform any authentication and/or encryption message processing. The encoded message 604 is then transmitted to the mobile device 614. The mobile device 614 invokes multiple decoding stages (616 and 618) at different times to more efficiently process the encoded message 604.

With reference to FIG. 7, the mobile device determines whether the encoded message 604 may be at least partially decoded. If it is determined that the encoded message 604 may not be partially decoded, then an indication is provided that the encoded message 604 has been received. Otherwise, the encoded message 604 is partially decoded through a first decoding stage 616. The partially decoded message 700 is stored to memory 702. Optionally, there is an indication at this point that a new message has been received. Upon a request 704 to access the message, the partially decoded message is retrieved from the memory 702 and further decoded by the second decoding stage 618. The decoded message 706 is made available for further processing.

Figure 8:
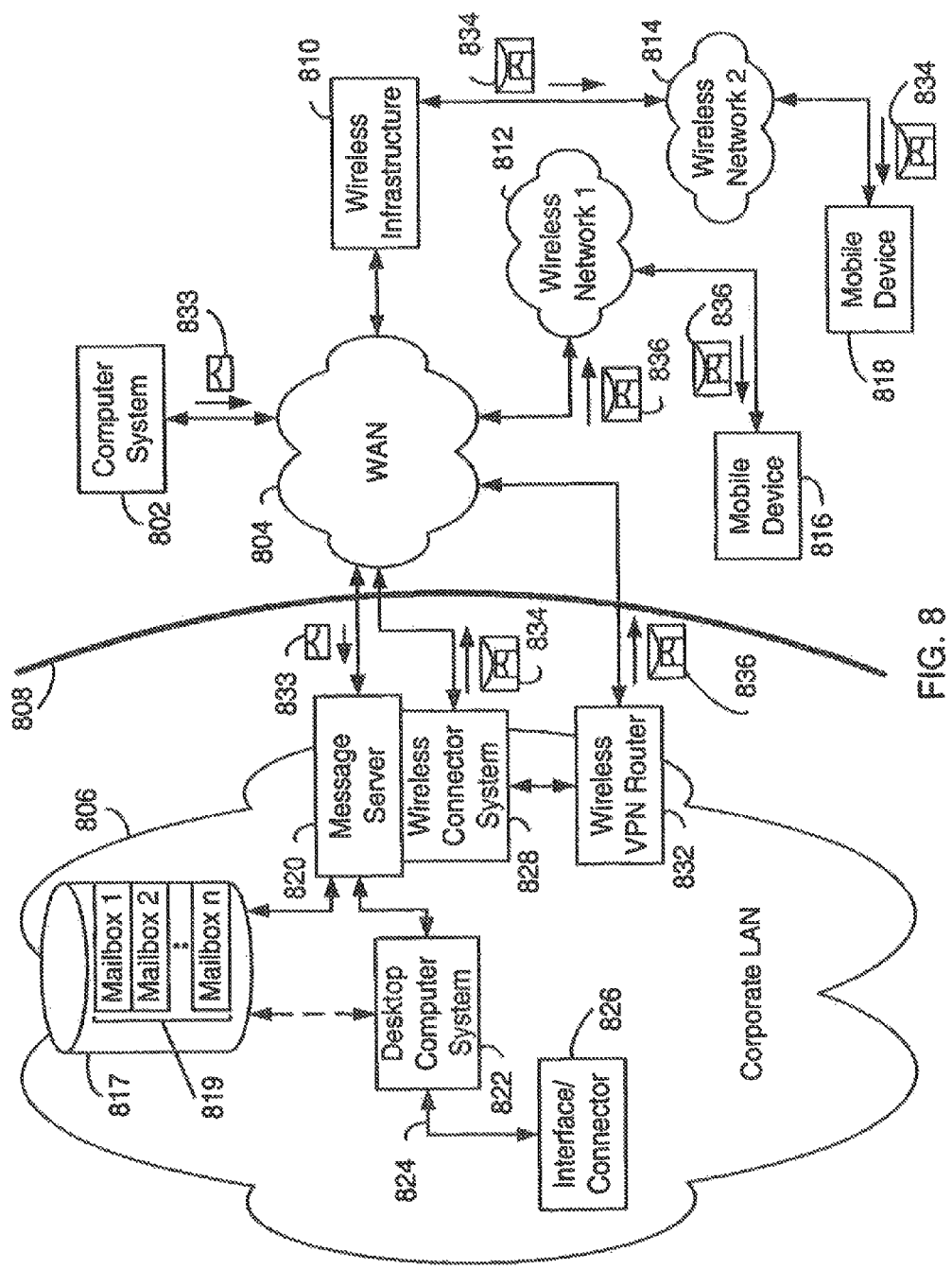
FIG. 8 is a block diagram showing an example communication system.
Figure 9:
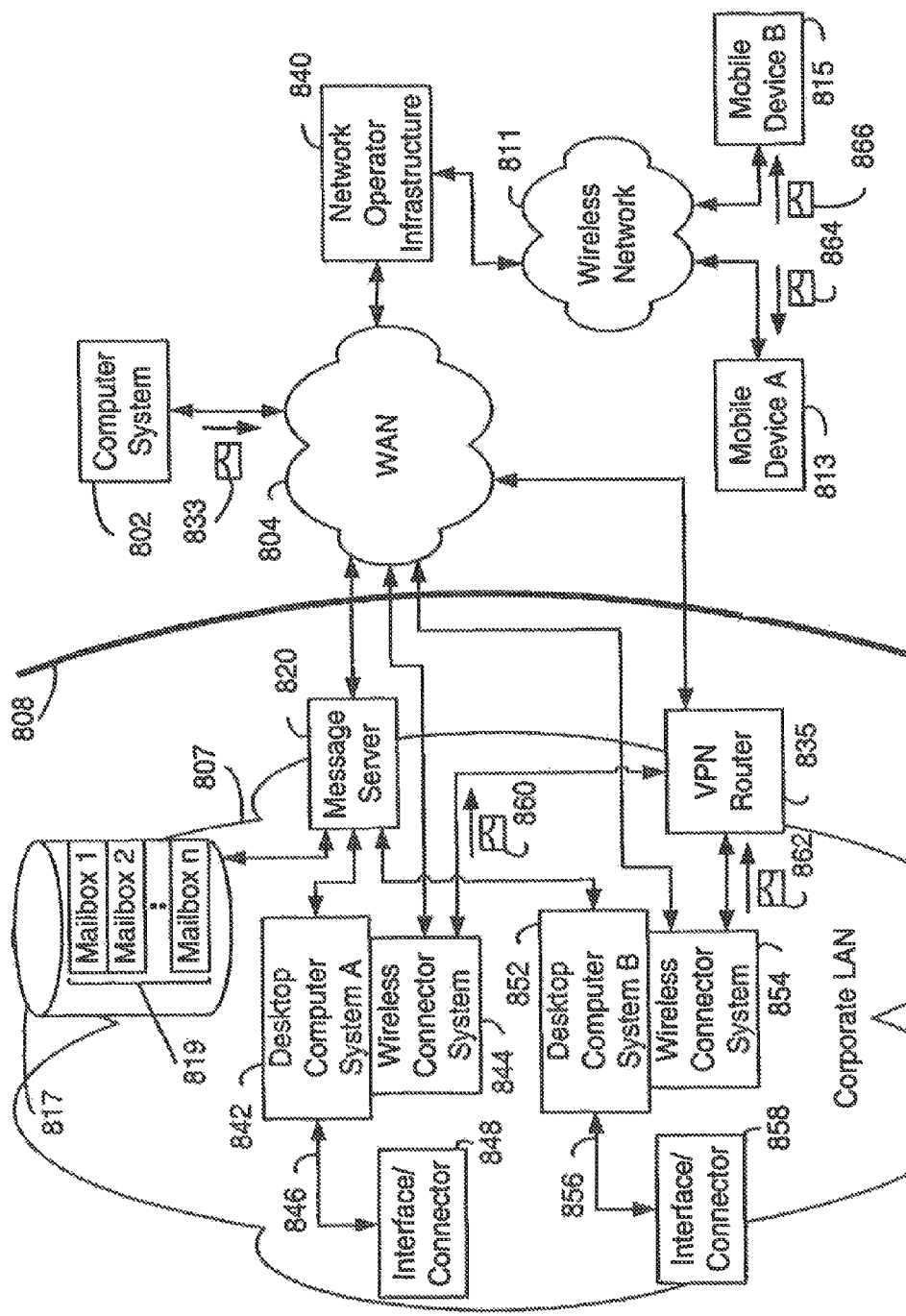
FIG. 9 is a block diagram of an alternative example communication system.
Figure 10:
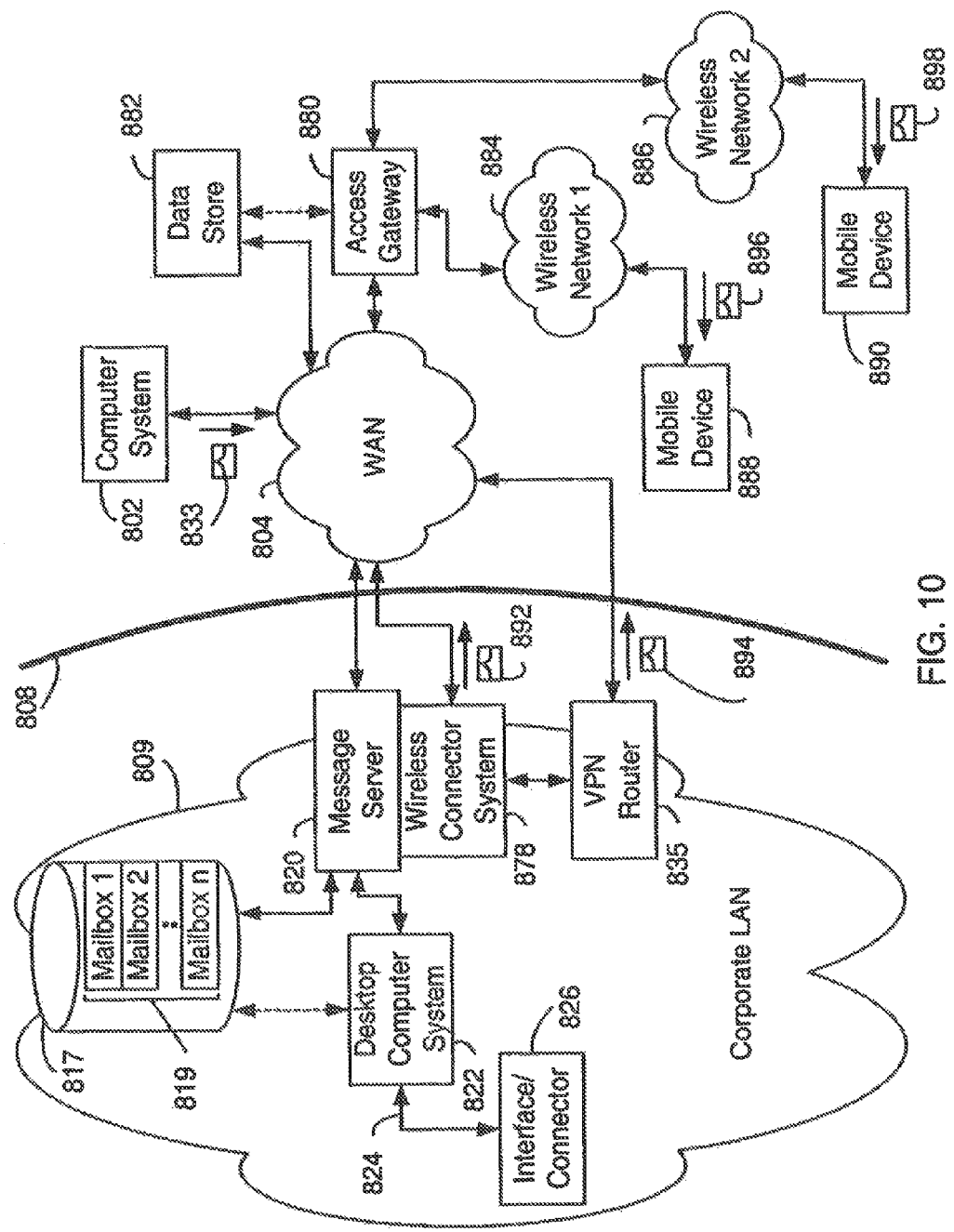
FIG. 10 is a block diagram of another alternative communication system.

Still further examples of the wide scope of the systems and methods disclosed herein are illustrated in FIGS. 8-10. FIGS. 8-10 describe additional uses of the systems and methods within different exemplary communication systems. FIG. 8 is a block diagram showing an example communication system. In FIG. 8, there is shown a computer system 802, a WAN 804, corporate LAN 806 behind a security firewall 808, wireless infrastructure 810, wireless networks 812 and 814, and mobile devices 816 and 818. The corporate LAN 806 includes a message server 820, a wireless connector system 828, a data store 817 including at least a plurality of mailboxes 819, a desktop computer system 822 having a communication link directly to a mobile device such as through physical connection 824 to an interface or connector 826, and a wireless VPN router 832. Operation of the system in FIG. 8 will be described below with reference to the messages 833, 834 and 836.

The computer system 802 may, for example, be a laptop, desktop or palmtop computer system configured for connection to the WAN 804. Such a computer system may connect to the WAN 804 via an ISP or ASP. Alternatively, the computer system 802 may be a network-connected computer system that, like the computer system 822, accesses the WAN 804 through a LAN or other network. Many modern mobile devices are enabled for connection to a WAN through various infrastructure and gateway arrangements, so that the computer system 802 may also be a mobile device.

The corporate LAN 806 is an illustrative example of a central, server-based messaging system that has been enabled for wireless communications. The corporate LAN 806 may be referred to as a "host system", in that it hosts both a data store 817 with mailboxes 819 for messages, as well as possibly further data stores (not shown) for other data items, that may be sent to or received from mobile devices 816 and 818, and the wireless connector system 828, the wireless VPN router 832, or possibly other components enabling communications between the corporate LAN 806 and one or more mobile devices 816 and 818. In more general terms, a host system may be one or more computers at, with or in association with which a wireless connector system is operating. The corporate LAN 806 is one preferred embodiment of a host system, in which the host system is a server computer running within a corporate network environment operating behind and protected by at least one security firewall 808. Other possible central host systems include ISP, ASP and other service provider or mail systems. Although the desktop computer system 824 and interface/connector 826 may be located outside such host systems, wireless communication operations may be similar to those described below.

The corporate LAN 806 implements the wireless connector system 828 as an associated wireless communications enabling component, which is normally a software program, a software application, or a software component built to work with at least one or more message server. The wireless connector system 828 is used to send user-selected information to, and to receive information from, one or more mobile devices 816 and 818, via one or more wireless networks 812 and 814. The wireless connector system 828 may be a separate component of a messaging system, as shown in FIG. 8, or may instead be partially or entirely incorporated into other communication system components. For example, the message server 820 may incorporate a software program, application, or component implementing the wireless connector system 828, portions thereof, or some or all of its functionality.

The message server 820, running on a computer behind the firewall 808, acts as the main interface for the corporation to exchange messages, including for example electronic mail, calendaring data, voice mail, electronic documents, and other PIM data with the WAN 804, which will typically be the Internet. The particular intermediate operations and computers are dependent upon the specific type of message delivery mechanisms and networks via which messages are exchanged, and therefore have not been shown in FIG. 8. The functionality of the message server 820 may extend beyond message sending and receiving, providing such features as dynamic database storage for data like calendars, todo lists, task lists, e-mail and documentation, as described above.

Message servers such as 820 normally maintain a plurality of mailboxes 819 in one or more data stores such as 817 for each user having an account on the server. The data store 817 includes mailboxes 819 for a number of ("n") user accounts. Messages received by the message server 820 that identify a user, a user account, a mailbox, or possibly another address associated with a user, account or mailbox 819 as a message recipient are stored in the corresponding mailbox 819. If a message is addressed to multiple recipients or a distribution list, then copies of the same message are typically stored to more than one mailbox 819. Alternatively, the message server 820 may store a single copy of such a message in a data store accessible to all of the users having an account on the message server, and store a pointer or other identifier in each recipient's mailbox 819. In typical messaging systems, each user accesses his or her mailbox 819 and its contents using a messaging client such as Microsoft Outlook or Lotus Notes, which normally operates on a PC, such as the desktop computer system 822, connected in the LAN 806. Although only one desktop computer system 822 is shown in FIG. 8, those skilled in the art will appreciate that a LAN will typically contain many desktop, notebook and laptop computer systems. Each messaging client normally accesses a mailbox 819 through the message server 820, although in some systems, a messaging client may enable direct access to the data store 817 and a mailbox 819 stored thereon by the desktop computer system 822. Messages may also be downloaded from the data store 817 to a local data store (not shown) on the desktop computer system 822.

Within the corporate LAN 806, the wireless connector system 828 operates in conjunction with the message server 820. The wireless connector system 828 may reside on the same computer system as the message server 820, or may instead be implemented on a different computer system. Software implementing the wireless connector system 828 may also be partially or entirely integrated with the message server 820. The wireless connector system 828 and the message server 820 are preferably designed to cooperate and interact to allow the pushing of information to mobile devices 816, 818. In such an installation, the wireless connector system 828 is preferably configured to send information that is stored in one or more data stores associated with the corporate LAN 806 to one or more mobile devices 816, 818, through the corporate firewall 808 and via the WAN 804 and one of the wireless networks 812, 814. For example, a user that has an account and associated mailbox 819 in the data store 817 may also have a mobile device, such as 816. As described above, messages received by the message server 820 that identify a user, account or mailbox 819 are stored to a corresponding mailbox 819 by the message server 820. If a user has a mobile device, such as 816, messages received by the message server 820 and stored to the user's mailbox 819 are preferably detected by the wireless connector system 828 and sent to the user's mobile device 816. This type of functionality represents a "push" message sending technique. The wireless connector system 828 may instead employ a "pull" technique, in which items stored in a mailbox 819 are sent to a mobile device 816, 818 responsive to a request or access operation made using the mobile device, or some combination of both techniques.

The use of a wireless connector 828 thereby enables a messaging system including a message server 820 to be extended so that each user's mobile device 816, 818. has access to stored messages of the message server 820. Although the systems and methods described herein are not restricted solely to a push-based technique, a more detailed description of push-based messaging may be found in the United States Patent and Applications incorporated by reference above. This push technique uses a wireless friendly encoding, compression and encryption technique to deliver all information to a mobile device, thus effectively extending the company firewall 808 to include the mobile devices 816, 818.

As shown in FIG. 8, there are several paths for exchanging information with a mobile device 816, 818 from the corporate LAN 806. One possible information transfer path is through the physical connection 824 such as a serial port, using an interface or connector 826. This path may be useful for example for bulk information updates often performed at initialization of a mobile device 816, 818 or periodically when a user of a mobile device 816, 818 is working at a computer system in th LAN 806, such as the computer system 822. For example, as described above, PIM data is commonly exchanged over such a connection, for example a serial port connected to an appropriate interface or connector 826 such as a cradle in or upon which a mobile device 816, 818 may be placed. The physical connection 824 may also be used to transfer other information from a desktop computer system 822 to a mobile device 816, 818, including private security keys ("private keys") such as private encryption or signature keys associated with the desktop computer system 822, or other relatively bulky information such as Certs and CRLs, used in some secure messaging schemes such as S/MIME and PGP.

Private key exchange using a physical connection 824 and connector or interface 826 allows a user's desktop computer system 822 and mobile device 816 or 818 to share at least one identity for accessing all encrypted and/or signed mail. The user's desktop computer system 822 and mobile device 816 or 818 can also thereby share private keys so that either the host system 822 or mobile device 816 or 818 can process secure messages addressed to the user's mailbox or account on the message server 820. The transfer of Certs and CRLs over such a physical connection may be desirable in that they represent a large amount of the data that is required for S/MIME, PGP and other public key security methods. A user's own Cert, a chain of Cert(s) used to verify the user's Cert, and CRL, as well as Certs, Cert chains and CRLs for other users, may be loaded onto a mobile device 816, 818 from the user's desktop computer system 822. This loading of other user's Certs and CRLs onto a mobile device 816, 818 allows a mobile device user to select other entities or users with whom they might be exchanging secure messages, and to pre-load the bulky information onto the mobile device through a physical connection instead of over the air, this saving time and wireless bandwidth when a secure message is received from or to be sent to such other users, or when the status of a Cert is to be determined.

In known "synchronization" type wireless messaging systems, a physical path has also been used to transfer messages from mailboxes 819 associated with a message server 820 to mobile devices 816 and 818.

Another method for data exchange with a mobile device 816, 818 is over-the-air, through the wireless connector system 828 and using wireless networks 812, 814. As shown in FIG. 8, this could involve a Wireless VPN router 832, if available in the network 806, or, alternatively, a traditional WAN connection to wireless infrastructure 810 that provides an interface to one or more wireless networks 812, 814. The Wireless VPN router 832 provides for creation of a VPN connection directly through a specific wireless network 812 to a wireless device 816. Such a Wireless VPN router 832 may be used in conjunction with a static addressing scheme such as IPV6.

If a wireless VPN router 832 is not available, then a link to a WAN 804, normally the Internet, is a commonly used connection mechanism that may be employed by the wireless connector system 828. To handle the addressing of the mobile device 816 and any other required interface functions, wireless infrastructure 810 is preferably used. The wireless infrastructure 810 may also determine a most likely wireless network for locating a given user, and track users as they roam between countries or networks. In wireless networks such as 812 and 814, messages are normally delivered to and from mobile devices 816, 818 via RF transmissions between base stations (not shown) and the mobile devices 816, 818.

A plurality of connections to wireless networks 812 and 814 may be provided, including, for example, ISDN, Frame Relay or T1 connections using the TCP/IP protocol used throughout the Internet. The wireless networks 812 and 814 could represent distinct, unique and unrelated networks, or they could represent the same network in different countries, and may be any of different types of networks, including but not limited to, data-centric wireless networks, voice-centric wireless networks, and dual-mode networks that can support both voice and data communications over the same or similar infrastructure, such as any of those described above.

In some implementations, more than one over-the-air information exchange mechanism may be provided in the corporate LAN 806. In the exemplary communication system of FIG. 8 for example, mobile devices 816, 818 associated with users having mailboxes 819 associated with user accounts on the message server 820 are configured to operate on different wireless networks 812 and 814. If the wireless network 812 supports IPv6 addressing, then the wireless VPN muter 832 may be used by the wireless connector system 828 to exchange data with any mobile device 816 operating within the wireless network 812. The wireless network 814 may be a different type of wireless network, however, such as the Mobitex network, in which case information may instead be exchanged with a mobile device 818 operating within the wireless network 814 by the wireless connector system 828 via a connection to the WAN 804 and the wireless infrastructure 810.

Operation of the system in FIG. 8 will now be described using an example of an e-mail message 833 sent from the computer system 802 and addressed to at least one recipient having both an account and mailbox 819 or like data store associated with the message server 820 and a mobile device 816 or 818. However, the e-mail message 833 is intended for illustrative purposes only. The exchange of other types of information between the corporate LAN 806 is preferably also enabled by the wireless connector system 828.

The e-mail message 833, sent from the computer system 802 via the WAN 804, may be fully in the clear, or signed with a digital signature and/or encrypted, depending upon the particular messaging scheme used. For example, if the computer system 802 is enabled for secure messaging using S/MIME, then the e-mail message 833 may be signed, encrypted, or both.

E-mail messages such as 833 normally use traditional SMTP, RFC822 headers and MIME body parts to define the format of the e-mail message. These techniques are all well known to one in the art. The e-mail message 833 arrives at the message server 820, which determines into which mailboxes 819 the e-mail message 833 should be stored. As described above, a message such as the e-mail message 833 may include a user name, a user account, a mailbox identifier, or other type of identifier that may be mapped to a particular account or associated mailbox 819 by the message server 820. For an e-mail message 833, recipients are typically identified using e-mail addresses corresponding to a user account and thus a mailbox 819.

The wireless connector system 828 sends or mirrors, via a wireless network 812 or 814, certain user-selected data items or parts of data items from the corporate LAN 806 to the user's mobile device 816 or 818, preferably upon detecting that one or more triggering events has occurred. A triggering event includes, but is not limited to, one or more of the following: screen saver activation at a user's networked computer system 822, disconnection of the user's mobile device 816 or 818 from the interface 826, or receipt of a command sent from a mobile device 816 or 818 to the host system to start sending one or more messages stored at the host system. Thus, the wireless connector system 828 may detect triggering events associated with the message server 820, such as receipt of a command, or with one or more networked computer systems 822, including the screen saver and disconnection events described above. When wireless access to corporate data for a mobile device 816 or 818 has been activated at the LAN 806, when the wireless connector system 828 detects the occurrence of a triggering event for a mobile device user, for example, data items selected by the user are preferably sent to the user's mobile device. In the example of the e-mail message 833, once a triggering event has been detected, the arrival of the message 833 at the message server 820 is detected by the wireless connector system 828. This may be accomplished, for example, by monitoring or querying mailboxes. 819 associated with the message server 820, or, if the message server 820 is a Microsoft Exchange server, then the wireless connector system 828 may register for advise syncs provided by the Microsoft Messaging Application Programming Interface (MAPI) to thereby receive notifications when a new message is stored to a mailbox 819.

When a data item such as the e-mail message 833 is to be sent to a mobile device 816 or 818, the wireless connector system 828 preferably repackages the data item in a manner that is transparent to the mobile device, so that information sent to and received by the mobile device appears similar to the information as stored on and accessible at the host system, LAN 806 in FIG. 8. One preferred repackaging method includes wrapping received messages to be sent via a wireless network 812, 814 in an electronic envelope that corresponds to the wireless network address of the mobile device 816, 818 to which the message is to be sent. Alternatively, other repackaging methods could be used, such as special-purpose TCP/IP wrapping techniques. Such repackaging preferably also results in e-mail messages sent from a mobile device 816 or 818 appearing to come from a corresponding host system account or mailbox 819 even though they are composed and sent from a mobile device. A user of a mobile device 816 or 818 may thereby effectively share a single e-mail address between a host system account or mailbox 819 and the mobile device.

Repackaging of the e-mail message 833 is indicated at 834 and 836. Repackaging techniques may be similar for any available transfer paths or may be dependent upon the particular transfer path, either the wireless infrastructure 810 or the wireless VPN router 832. For example, the e-mail message 833 is preferably compressed and encrypted, either before or after being repackaged at 834, to thereby effectively provide for secure transfer to the mobile device 818. Compression reduces the bandwidth required to send the message, whereas encryption ensures confidentiality of any messages or other information sent to mobile devices 816 and 818. In contrast, messages transferred via a VPN router 832 might only be compressed and not encrypted, since a VPN connection established by the VPN router 832 is inherently secure. Messages are thereby securely sent, via either encryption at the wireless connector system 828, which may be considered a non-standard VPN tunnel or a VPN-like connection for example, or the VPN router 832, to mobile devices 816 and 818. Accessing messages using a mobile device 816 or 818 is thus no less secure than accessing mailboxes at the LAN 806 using the desktop computer system 822.

When a repackaged message 834 or 836 arrives at a mobile device 816 or 818, via the wireless infrastructure 810, or via the wireless VPN router 832, the mobile device 816 or 818 removes the outer electronic envelope from the repackaged message 834 or 836, and performs any required decompression and decryption operations. Messages sent from a mobile device 816 or 818 and addressed to one or more recipients are preferably similarly repackaged, and possibly compressed and encrypted, and sent to a host system such as the LAN 806. The host system then removes the electronic envelope from the repackaged message, decrypts and decompresses the message if desired, and routes the message to the addressed recipients.

Another goal of using an outer envelope is to maintain at least some of the addressing information in the original e-mail message 833. Although the outer envelope used to route information to mobile devices 816, 818 is addressed using a network address of one or more mobile devices, the outer envelope preferably encapsulates the entire original e-mail message 833, including at least one address field, possibly in compressed and/or encrypted form. This allows original "To", "From" and "CC" addresses of the e-mail message 833 to be displayed when the outer envelope is removed and the message is displayed on a mobile device 816 or 818. The repackaging also allows reply messages to be delivered to addressed recipients, with the "From" field reflecting an address of the mobile device user's account or mailbox on the host system, when the outer envelope of a repackaged outgoing message sent from a mobile device is removed by the wireless connector system 828. Using the user's account or mailbox address from the mobile device 816 or 818 allows a message sent from a mobile device to appear as though the message originated from the user's mailbox 819 or account at the host system rather than the mobile device.

FIG. 9 is a block diagram of an alternative exemplary communication system, in which wireless communications are enabled by a component associated with an operator of a wireless network. As shown in FIG. 9, the system includes a computer system 802, WAN 804, a corporate LAN 807 located behind a security firewall 808, network operator infrastructure 840, a wireless network 811, and mobile devices 813 and 815. The computer system 802, WAN 804, security firewall 808, message server 820, data store 817, mailboxes 819, and VPN router 835 are substantially the same as the similarly-labelled components in. FIG. 8. However, since the VPN router 835 communicates with the network operator infrastructure 840, it need not necessarily be a wireless VPN router in the system of FIG. 9. The network operator infrastructure 840 enables wireless information exchange between the LAN 807 and mobile devices 813, 815, respectively associated with the computer systems 842 and 852 and configured to operate within the wireless network 811. In the LAN 807, a plurality of desktop computer systems 842, 852 are shown, each having a physical connection 846, 856 to an interface or connector 848, 858. A wireless connector system 844, 854 is operating on or in conjunction with each computer system 842, 852.

The wireless connector systems 844, 854 are similar to the wireless connector system 828 described above, in that it enables data items, such as e-mail messages and other items that are stored in mailboxes 819, and possibly data items stored in a local or network data store, to be sent from the LAN 807 to one or more mobile devices 813, 815. In FIG. 9 however, the network operator infrastructure 840 provides an interface between the mobile devices 813, 815 and the LAN 807. As above, operation of the system shown in FIG. 9 will be described below in the context of an e-mail message as an illustrative example of a data item that may be sent to a mobile device 813, 815.

When an e-mail message 833, addressed to one or more recipients having an account on the message server 820, is received by the message server 820, the message, or possibly a pointer to a single copy of the message stored in a central mailbox or data store, is stored into the mailbox 819 of each such recipient. Once the e-mail message 833 or pointer has been stored to a mailbox 819, it may be accessed using a mobile device 813 or 815. In the example shown in FIG. 9, the e-mail message 833 has been addressed to the mailboxes 819 associated with both desktop computer systems 842 and 852 and thus both mobile devices 813 and 815.

As those skilled in the art will appreciate, communication network protocols commonly used in wired networks such as the LAN 807 and/or the WAN 804 are not suitable or compatible with wireless network communication protocols used within wireless networks such as 811. For example, communication bandwidth, protocol overhead and network latency, which are primary concerns in wireless network communications, are less significant in wired networks, which typically have much higher capacity and speed than wireless networks. Therefore, mobile devices 813 and 815 cannot normally access the data store 817 directly. The network operator infrastructure 840 provides a bridge between the Wireless network 811 and the LAN 807.

The network operator infrastructure 840 enables a mobile device 813, 815 to establish a connection to the LAN 807 through the WAN 804, and may, for example, be operated by an operator of the wireless network 811 or a service provider that provides wireless communication service for mobile devices 813 and 815. In a pull-based system, a mobile device 813, 815 may establish a communication session with the network operator infrastructure 840 using a wireless network compatible communication scheme, preferably a secure scheme such as Wireless Transport Layer Security (WTLS) when information should remain confidential, and a wireless web browser such as a Wireless Application Protocol (WAP) browser. A user may then request (through manual selection or pre-selected defaults in the software residing in the mobile device) any or all information, or just new information, stored in a mailbox 819 in the data store 817 at the LAN 807. The network operator infrastructure 840 then establishes a connection or session with a wireless connector system 844, 854, using Secure Hypertext Transfer Protocol (IMPS), for example, if no session has already been established. As above, a session between the network operator infrastructure 840 and a wireless connector system 844, 854 may be made via a typical WAN connection or through the VPN router 835 if available. When time delays between receiving a request from a mobile device 813, 815 and delivering requested information back to the device are to be minimized, the network operator infrastructure 840 and the wireless connector systems 844, 854 may be configured so that a communication connection remains open once established.

In the system of FIG. 9, requests originating from mobile device A 813 and B 815 would be sent to the wireless connector systems 844 and 854, respectively. Upon receiving a request for information from the network operator infrastructure 840, a wireless connector system 844, 854 retrieves requested information from a data store. For the e-mail message 833, the wireless connector system 844, 854 retrieves the e-mail message 833 from the appropriate mailbox 819, typically through a messaging client operating in conjunction with the computer system 842, 852, which may access a mailbox 819 either via the message server 820 or directly. Alternatively, a wireless connector system 844, 854 may be configured to access mailboxes 819 itself, directly or through the message server 820. Also, other data stores, both network data stores similar to the data store 817 and local data stores associated with each computer system 842, 852, may be accessible to a wireless connector system 844, 854, and thus to a mobile device 813, 815.

If the e-mail message 833 is addressed to the message server accounts or mailboxes 819 associated with both computer systems 842 and 852 and devices 813 and 815, then the e-mail Message 833 may be sent to the network operator infrastructure 840 as shown at 860 and 862, which then sends a copy of the e-mail message to each mobile device 813 and 815, as indicated at 864 and 866. Information may be transferred between the wireless connector systems 844, 854 and the network operator infrastructure 840 via either a connection to the WAN 804 or the VPN router 835. When the network operator infrastructure 840 communicates with the wireless connector systems 844, 854 and the mobile devices 813, 815 via different protocols, translation operations may be performed by the network operator infrastructure 840. Repackaging techniques may also be used between the wireless connector systems 844, 854 and the network operator infrastructure 840, and between each mobile device 813, 815 and the network operator infrastructure 840.

Messages or other information to be sent from a mobile device 813, 815 may be processed in a similar manner, with such information first being transferred from a mobile device 813, 815 to the network operator infrastructure 840. The network operator infrastructure 840 may then send the information to a wireless connector system 844, 854 for storage in a mailbox 819 and delivery to any addressed recipients by the message server 820, for example, or may alternatively deliver the information to the addressed recipients.

The above description of the system in FIG. 9 relates to pull-based operations. The wireless connector systems 844, 854 and the network operator infrastructure may instead be configured to push data items to mobile devices 813 and 815. A combined push/pull system is also possible. For example, a notification of a new message or a list of data items currently stored in a data store at the LAN 807 could be pushed to a mobile device 813, 815, and then be used to request messages or data items from the LAN 807 via the network operator infrastructure 840.

If mobile devices associated with user accounts on the LAN 807 are configured to operate within different wireless networks, then each wireless network may have an associated wireless network infrastructure component similar to 840.

Although separate, dedicated wireless connector systems 844, 854 are shown for each computer system 842, 852 in the system of FIG. 9, one or more of the wireless connector systems 844, 854 may preferably be configured to operate in conjunction with more than one computer system 842, 852, or to access a data store or mailbox 819 associated with more than one computer system. For example, the wireless connector system 844 may be granted access to the mailboxes 819 associated with both the computer system 842 and the computer system 852. Requests for data items from either mobile device A 813 or B 815 may then be processed by the wireless connector system 844. This configuration may be useful to enable wireless communications between the LAN 807 and the mobile devices 813 and 815 without requiring a desktop computer system 842, 852 to be running for each mobile device user. A wireless connector system may instead be implemented in conjunction with the message server 820 to enable wireless communications.

FIG. 10 is a block diagram of another alternative communication system. The system includes a computer system 802, WAN 804, a corporate LAN 809 located behind a security firewall 808, an access gateway 880, data store 882, wireless networks 884 and 886, and mobile devices 888 and 890. In the LAN 809, the computer system 802, WAN 804, security firewall 808, message server 820, data store 817, mailboxes 819, desktop computer system 822, physical connection 824, interface or connector 826 and VPN router 835 are substantially the same as the corresponding components described above. The access gateway 880 and data store 882 provide mobile devices 888 and 890 with access to data items stored at the LAN 809. In FIG. 10, a wireless connector system 878 operates on or in conjunction with the message server 820, although a wireless connector system may instead operate on or in conjunction with one or more desktop computer systems in the LAN 809.

The wireless connector system 878 provides for transfer of data items stored at the LAN 809 to one or more mobile devices 888, 890. These data items preferably include e-mail messages stored in mailboxes 819 in the data store 817, as well as possibly other items stored in the data store 817 or another network data store or a local data store of a computer system such as 822.

As described above, an e-mail message 833 addressed to one or more recipients having an account on the message server 820 and received by the message server 820 is stored into the mailbox 819 of each such recipient. In the system of FIG. 10, the external data store 882 preferably has a similar structure to, and remains synchronized with, the data store 817. PIM information or data stored at data store 882 is preferably independently modifiable to the PIM information or data stored at the host system. In this particular configuration, the independently modifiable information at the external data store 882 may maintain synchronization of a plurality of data stores associated with a user (i.e., data on a mobile device, data on a personal computer at home, data at the corporate LAN, etc.). This synchronization may be accomplished, for example, through updates sent to the data store 882 by the wireless connector system 878 at certain time intervals, each time an entry in the data store 817 is added or changed, at certain times of day, or when initiated at the LAN 809, by the message server 820 or a computer system 822, at the data store 882, or possibly by a mobile device 888, 890 through the access gateway 880. In the case of the e-mail message 833, an update sent to the data store 882 some time after the e-mail message 833 is received may indicate that the message 833 has been stored in a certain mailbox 819 in the store 817, and a copy of the e-mail message will be stored to a corresponding storage area in the data store 882. When the e-mail message 833 has been stored in the mailboxes 819 corresponding to the mobile devices 888 and 890, for example, one or more copies of the e-mail message, indicated at 892 and 894 in FIG. 10, are sent to and stored in corresponding storage areas or mailboxes in the data store 882. As shown, updates or copies of stored information in the data store 817 may be sent to the data store 882 via a connection to the WAN 804 or the VPN router 835. For example, the wireless connector system 878 may post updates or stored information to a resource in the data store 882 via an HTTP post request. Alternatively, a secure protocol such as HTTPS or Secure Sockets Layer (SSL) may be used. Those skilled in the art will appreciate that a single copy of a data item stored in more than one location in a data store at the LAN 809 may instead be sent to the data store 882. This copy of the data item could then be stored either in more than one corresponding location in the data store 882, or a single copy may be stored in the data store 882, with a pointer or other identifier of the stored data item being stored in each corresponding location in the data store 882.

The access gateway 880 is effectively an access platform, in that it provides mobile devices 888 and 890 with access to the data store 882. The data store 882 may be configured as a resource accessible on the WAN 804, and the access gateway 880 may be an ISP system or WAP gateway through which mobile devices 888 and 890 may connect to the WAN 804. A WAP browser or other browser compatible with the wireless networks 884 and 886 may then be used to access the data store 882, which is synchronized with the data store 817, and download stored data items either automatically or responsive to a request from a mobile device 888, 890. As shown at 896 and 898, copies of the e-mail message 833, which was stored in the data store 817, may be sent to the mobile devices 888 and 890. A data store (not shown) on each mobile device 888, 890 may thereby be synchronized with a portion, such as a mailbox 819, of a data store 817 on a corporate LAN 809. Changes to a mobile device data store may similarly be reflected in the data stores 882 and 817.

Figure 11:
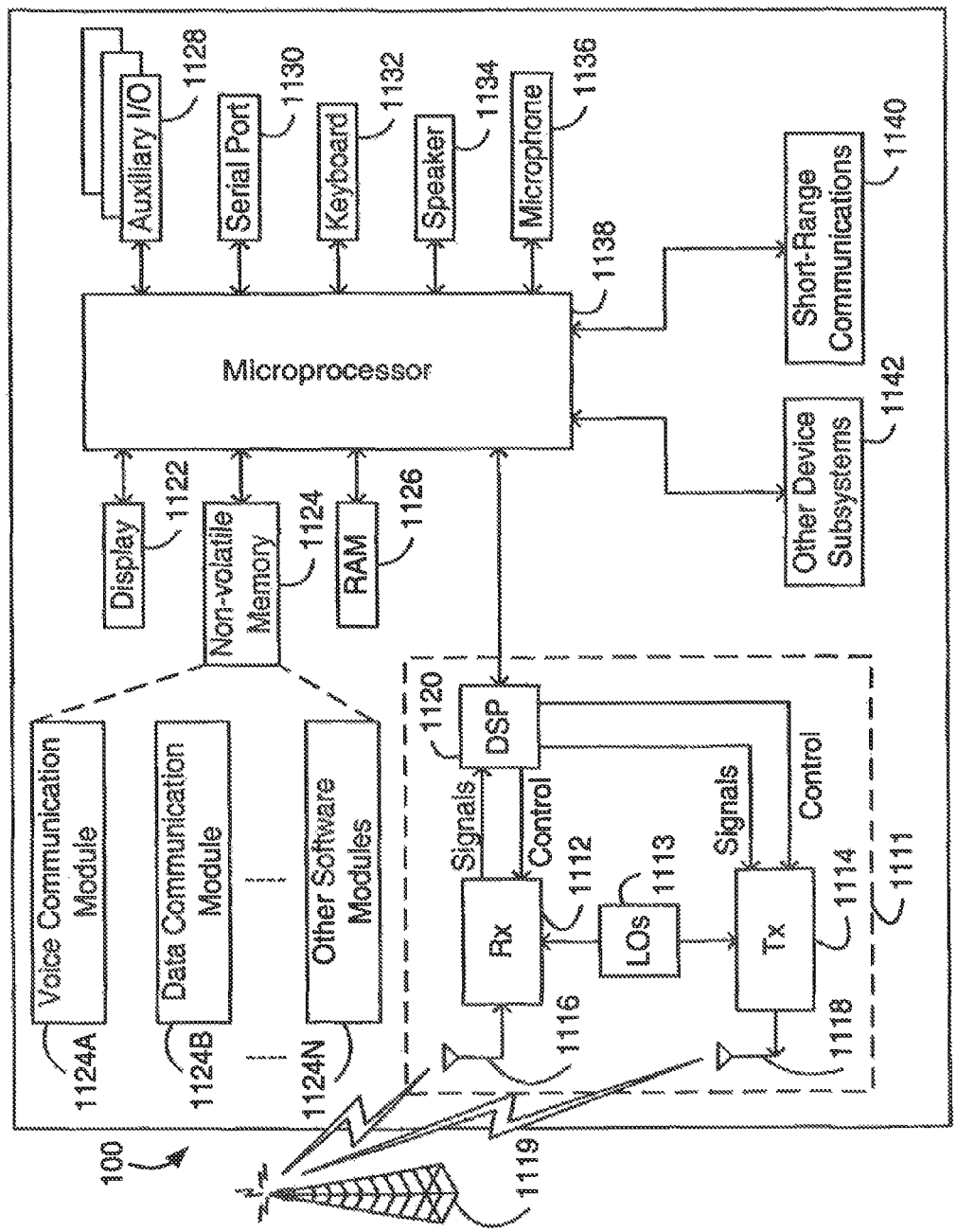
FIG. 11 is a block diagram of an example mobile device.

FIG. 11 is a block diagram of an example mobile device. The mobile device 100 is a dual-mode mobile device and includes a transceiver 1111, a microprocessor 1138, a display 1122, non-volatile memory 1124, random access memory (RAM) 1126, one or more auxiliary input/output (I/O) devices 1128, a serial port 1130, a keyboard 1132, a speaker 1134, a microphone 1136, a short-range wireless communications sub-system 1140, and other device sub-systems 1142.

The transceiver 1111 includes a receiver 1112, a transmitter 1114, antennas 1116 and 1118, one or more local oscillators 1113, and a digital signal processor (DSP) 1120. The antennas 1116 and 1118 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 11 by the communication tower 1119. These voice and data networks may be separate communication networks using separate infrastructure, such as base stations, network controllers, etc., or they may be integrated into a single wireless network.

The transceiver 1111 is used to communicate with the network 1119, and includes the receiver 1112, the transmitter 1114, the one or more local oscillators 1113 and the DSP 1120. The DSP 1120 is used to send and receive signals to and from the transceivers 1116 and 1118, and also provides control information to the receiver 1112 and the transmitter 1114. If the voice and data communications occur at a single frequency, or closely-spaced sets of frequencies, then a single local oscillator 1113 may be used in conjunction with the receiver 1112 and the transmitter 1114. Alternatively, if different frequencies are utilized for voice communications versus data communications for example, then a plurality of local oscillators 1113 can be used to generate a plurality of frequencies corresponding to the voice and data networks 1119. Information, which includes both voice and data information, is communicated to and from the transceiver 1111 via a link between the DSP 1120 and the microprocessor 1138.

The detailed design of the transceiver 1111, such as frequency band, component selection, power level, etc., will be dependent upon the communication network 1119 in which the mobile device 100 is intended to operate. For example, a mobile device 100 intended to operate in a North American market may include a transceiver 1111 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 1119, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 1119, other than any legally required operations, such as '911' emergency calling.

After any required network registration or activation procedures have been completed, the mobile device 100 may the send and receive communication signals, including both voice and data signals, over the networks 1119. Signals received by the antenna 1116 from the communication network 1119 are routed to the receiver 1112, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 1120. In a similar manner, signals to be transmitted to the network 1119 are processed, including modulation and encoding, for example, by the DSP 1120 and are then provided to the transmitter 1114 for digital to analog conversion, frequency up conversion, filtering, amplification and transmission to the communication network 1119 via the antenna 1118.

In addition to processing the communication signals, the DSP 1120 also provides for transceiver control. For example, the gain levels applied to communication signals in the receiver 1112 and the transmitter 1114 may be adaptively controlled through automatic gain control algorithms implemented in the DSP 1120. Other transceiver control algorithms could also be implemented in the DSP 1120 in order to provide more sophisticated control of the transceiver 1111.

The microprocessor 1138 preferably manages and controls the overall operation of the mobile device 100. Many types of microprocessors or microcontrollers could be used here, or, alternatively, a single DSP 1120 could be used to carry out the functions of the microprocessor 1138. Low-level communication functions, including at least data and voice communications, are performed through the DSP 1120 in the transceiver 1111. Other, high-level communication applications, such as a voice communication application 1124A, and a data communication application 1124B may be stored in the non-volatile memory 1124 for execution by the microprocessor 1138. For example, the voice communication module 1124A may provide a high-level user interface operable to transmit and receive voice calls between the mobile device 100 and a plurality of other voice or dual-mode devices via the network 1119. Similarly, the data communication module 1124B may provide a high-level user interface operable for sending and receiving data, such as e-mail messages, files, organizer information, short text messages, etc., between the mobile device 100 and a plurality of other data devices via the networks 1119.

The microprocessor 1138 also interacts with other device subsystems, such as the display 1122, the RAM 1126, the auxiliary input/output (I/O) subsystems 1128, the serial port 1130, the keyboard 1132, the speaker 1134, the microphone 1136, the short-range communications subsystem 1140 and any other device subsystems generally designated as 1142.

Some of the subsystems shown in FIG. 11 perform communication-related functions, whereas other subsystems may provide "resident" or on-device functions. Notably, some subsystems, such as the keyboard 1132 and the display 1122 may be used for both communication-related functions, such as entering a text message for transmission over a data communication network, and device-resident functions such as a calculator or task list or other PDA type functions.

Operating system software used by the microprocessor 1138 is preferably stored in a persistent store such as non-volatile memory 1124. The non-volatile memory 1124 may be implemented, for example, as a Flash memory component, or as battery backed-up RAM. In addition to the operating system, which controls low-level functions of the mobile device 1110, the non-volatile memory 1124 includes a plurality of software modules 1124A-1124N that can be executed by the microprocessor 1138 (and/or the DSP 1120), including a voice communication module 1124A, a data communication module 1124B, and a plurality of other operational modules 1124N for carrying out a plurality of other functions. These modules are executed by the microprocessor 1138 and provide a high-level interface between a user and the mobile device 100. This interface typically includes a graphical component provided through the display 1122, and an input/output component provided through the auxiliary I/O 1128, keyboard 1132, speaker 1134, and microphone 1136. The operating system, specific device applications or modules, or parts thereof, may be temporarily loaded into a volatile store, such as RAM 1126 for faster operation. Moreover, received communication signals may also be temporarily stored to RAM 1126, before permanently writing them to a file system located in a persistent store such as the Flash memory 1124.

An exemplary application module 1124N that may be loaded onto the mobile device 100 is a personal information manager (PIM) application providing PDA functionality, such as calendar events, appointments, and task items. This module 1124N may also interact with the voice communication module 1124A for managing phone calls, voice mails, etc., and may also interact with the data communication module for managing e-mail communications and other data transmissions. Alternatively, all of the functionality of the voice communication module 1124A and the data communication module 1124B may be integrated into the PIM module.

The non-volatile memory 1124 preferably also provides a file system to facilitate storage of PIM data items on the device. The PIM application preferably includes the ability to send and receive data items, either by itself, or in conjunction with the voice and data communication modules 1124A, 1124B, via the wireless networks 1119. The PIM data items are preferably seamlessly integrated, synchronized and updated, via the wireless networks 1119, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 1126. Such information may instead be stored in the non-volatile memory 1124, for example, when storage intervals are relatively short, such that the information is removed from memory soon after it is stored. However, storage of this information in the RAM 1126 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 1130 of the mobile device 100 to the serial port of a computer system or device. The serial port 1130 may also be used to enable a user to set preferences through an external device or software application, or to download other application modules 1124N for installation. This wired download path may be used to load an encryption key onto the device, which is a more secure method than exchanging encryption information via the wireless network 1119. Interfaces for other wired download paths may be provided in the mobile device 100, in addition to or instead of the serial port 1130. For example, a USB port would provide an interface to a similarly equipped personal computer.

Additional application modules 1124N may be loaded onto the mobile device 100 through the networks 1119, through an auxiliary I/O subsystem 1128, through the serial port 1130, through the short-range communications subsystem 1140, or through any other suitable subsystem 1142, and installed by a user in the non-volatile memory 1124 or RAM 1126. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 1111 and provided to the microprocessor 1138, which preferably further processes the received signal in multiple stages as described above, for eventual output to the display 1122, or, alternatively, to an auxiliary I/O device 1128. A user of mobile device 100 may also compose data items, such as e-mail messages, using the keyboard 1132, which is preferably a complete alphanumeric keyboard laid out in the QWERTY style, although other styles of complete alphanumeric keyboards such as the known DVORAK style may also be used, User input to the mobile device 100 is further enhanced with a plurality of auxiliary I/O devices 1128, which may include a thumbwheel input device, a touchpad, a variety of switches, a rocker input switch, etc. The composed data items input by the user may then be transmitted over the communication networks 1119 via the transceiver module 1111.

When the mobile device 100 is operating in a voice communication mode, the overall operation of the mobile device is substantially similar to the data mode, except that received signals are preferably be output to the speaker 1134 and voice signals for transmission are generated by a microphone 1136. Alternative voice or audio I/O subsystems, such as a voice message recording subsystem, may also be implemented on the mobile device 100. Although voice or audio signal output is preferably accomplished primarily through the speaker 1134, the display 1122 may also be used to provide an indication of the identity of a calling party, the duration of a voice call, or other voice call related information. For example, the microprocessor 1138, in conjunction with the voice communication module and the operating system software, may detect the caller identification information of an incoming voice call and display it on the display 1122.

A short-range communications subsystem 1140 is also included in the mobile device 100. The subsystem 1140 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

What is claimed is:

1. A method for processing encoded messages at a wireless mobile communication device, comprising the steps of:
   receiving at the wireless mobile communication device an encoded message, wherein a plurality of decoding operations are to be performed upon the encoded message before the decoded message is used within the wireless mobile communication device;
   performing by the wireless mobile communication device a first decoding operation upon the encoded message so as to generate a partially decoded message, wherein the first decoding operation performs at least one of the decoding operations which are to be performed upon the encoded message;
   storing the partially decoded message to a memory of the wireless mobile communication device;
   receiving a request to access the received message;
   retrieving the partially decoded message from the memory in response to receiving the request to access the received message; and
   performing by the wireless mobile communication device a second decoding operation upon the partially decoded message after receiving the request to access the received message so as to generate a decoded message for use within the wireless mobile communication device;
   wherein the message is encoded by being signed and then encrypted, wherein the first decoding operation performed before receiving the request to access the received message comprises decoding operations associated with transmission encoding, retrieval of at least one decryption key, and partial decryption of the message using the retrieved decryption key, wherein the partial decryption of the message does not involve decrypting a signature of the message; and wherein the second decoding operation comprises decryption of the partially decoded message using the retrieved decryption key and signature verification upon the decrypted message.

2. The method of claim 1, wherein a user has provided the request to access the received message.

3. The method of claim 1, wherein the encoded message is an encrypted message comprising encrypted content and an encrypted session key.

4. The method of claim 1, wherein the encoded message comprises encrypted content and an encrypted session key, and wherein the plurality of decoding operations that are to be performed upon the encoded message comprises decrypting the encrypted session key and decrypting the message's encrypted content using the decrypted session key.

5. The method of claim 1, further comprising the step of:
   indicating that the encoded message has been received at the wireless mobile communication device after performing the first decoding operation.

6. The method of claim 1, wherein the first decoding operation comprises decoding operations that can be performed without requiring action from a user, and wherein the first decoding operation is performed before the user is notified of receipt of the message.

7. The method of claim 1, further comprising the steps of:
   determining whether the encoded message is capable of being partially decoded; and
   performing the first decoding operation so as to generate the partially decoded message if the encoded message is capable of being partially decoded.

8. The method of claim 1, further comprising the steps of:
   receiving at the wireless mobile communication device a second encoded message;
   determining whether the second encoded message is capable of being partially decoded; and
   storing the second encoded message to the memory without performing a first decoding operation upon the second encoded message if the second encoded message is not capable of being partially decoded.

9. The method of claim 1, wherein time delay associated with providing the received message to the user in response to the request to access is reduced due to the performing of the first decoding operation prior to storing the partially decoded message to the memory.

10. The method of claim 1, wherein the first decoding operation is performed in the background before a user is informed that the message has been received.

11. The method of claim 1, wherein the partially decoded message is stored to the memory as a context object in the memory.

12. The method of claim 11, wherein the context object is retrieved from the memory so that the context object may be further decoded so as to generate a decoded context object.

13. The method of claim 1, wherein the first decoding operation is repeated for the partially decoded message after the message is retrieved from the memory.

14. The method of claim 1, further comprising the steps of:
   determining whether an encoded message has been partially decoded; and
   performing the second decoding operation upon the partially decoded message where the encoded message has been partially decoded.

15. The method of claim 1, wherein the encoded message comprises message information that was encoded, and wherein a plurality of decoding operations are to be performed upon the encoded message before the message information is used within the wireless mobile communication device.

16. The method of claim 1, wherein certificate information of a user of the wireless mobile communication device is transferred to the wireless mobile communication device through a wireless mobile communication device information transfer means.

17. The method of claim 16, wherein the wireless mobile communication device information transfer means comprises a wireless communication module.

18. The method of claim 17, wherein the wireless communication module is selected from the group consisting of: an infrared device, a Bluetooth module, and an 802.11 module.

19. The method of claim 16, further comprising the steps of:
- determining whether a third received encoded message is capable of being partially decoded;
- storing the third encoded message to the memory without performing a first decoding operation that would generate a partially decoded message version of the third encoded message if the third received encoded message is not capable of being partially decoded; and
- indicating that the third encoded message has been received at the wireless mobile communication device.

20. The method of claim 1, wherein certificate revocation lists are transferred to the wireless mobile communication device through a wireless mobile communication device information transfer means.

21. The method of claim 1, wherein a message server transmits the encoded message through a wireless infrastructure and a wireless network to the wireless mobile communication device, wherein the encoded message comprises a plurality of encrypted session keys, wherein the message server determines the encrypted session key associated with the wireless mobile communication device, and wherein the message server reorganizes the encoded message such that the encoded message is sent to the wireless mobile communication device without containing at least one encrypted session key that is not associated with the wireless mobile communication device.

22. The method of claim 21, wherein the encoded message comprises a digital signature, and wherein the message server verifies the digital signature and sends to the wireless mobile communication device a result of the digital signature verification.

23. The method of claim 1, wherein the device receives inputted security information during the second decoding operation in order to have an encrypted session key decrypted.

24. A non-transitory computer-readable storage medium encoded with instructions that cause a data processor to perform a method that processes an encoded message at a wireless mobile communication device, said method comprising the steps of:
- performing by the wireless mobile communication device a first decoding operation upon the encoded message so as to generate a partially decoded message, wherein the first decoding operation performs at least one of the decoding operations which are to be performed upon the encoded message;
- storing the partially decoded message to a memory of the wireless mobile communication device;
- retrieving the partially decoded message from the memory in response to a request to access the received message; and
- performing by the wireless mobile communication device a second decoding operation upon the partially decoded message after receiving the request to access the received message so as to generate a decoded message for use within the wireless mobile communication device;
- wherein the message is encoded by being signed and then encrypted, wherein the first decoding operation performed before receiving the request to access the received message comprises decoding operations associated with transmission encoding, retrieval of at least one decryption key, and partial decryption of the message using the retrieved decryption key, wherein the partial decryption of the message does not involve decrypting a signature of the message; and wherein the second decoding operation comprises decryption of the partially decoded message using the retrieved decryption key and signature verification upon the decrypted message.

25. A system that processes an encoded message at a wireless mobile communication device, wherein a plurality of decoding operations are to be performed upon the encoded message before the message is used within the wireless mobile communication device, said system comprising:
- a first decoding stage having a data access connection to the encoded message, said first decoding stage performing a first decoding operation upon the encoded message so as to generate a partially decoded message, wherein the first decoding stage performs at least one of the plurality of decoding operations;
- a memory that stores the partially decoded message; and
- a second decoding stage having a data access connection to the partially decoded message stored in the memory, wherein the second decoding stage performs a second decoding operation upon the partially decoded message in response to a request to access the received message so as to generate a decoded message for use within the wireless mobile communication device;
- said first decoding stage and said second decoding stage executing on a data processor of the wireless mobile communication device;
- wherein the message is encoded by being signed and then encrypted, wherein the first decoding operation performed before receiving the request to access the received message comprises decoding operations associated with transmission encoding, retrieval of at least one decryption key, and partial decryption of the message using the retrieved decryption key, wherein the partial decryption of the message does not involve decrypting a signature of the message; and wherein the second decoding operation comprises decryption of the partially decoded message using the retrieved decryption key and signature verification upon the decrypted message.

* * * * *